United States Patent
Gotohda

(10) Patent No.: US 8,045,007 B2
(45) Date of Patent: Oct. 25, 2011

(54) IMAGE CAPTURING SYSTEM AND IMAGE CAPTURING METHOD

(75) Inventor: Yukita Gotohda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1250 days.

(21) Appl. No.: 11/313,681

(22) Filed: Dec. 22, 2005

(65) Prior Publication Data

US 2006/0158534 A1  Jul. 20, 2006

(30) Foreign Application Priority Data

Dec. 24, 2004 (JP) .................................. 2004-374689
Dec. 24, 2004 (JP) .................................. 2004-374690
Dec. 7, 2005 (JP) .................................. 2005-353719

(51) Int. Cl.
| H04N 5/225 | (2006.01) |
| H04N 7/18 | (2006.01) |
| H04N 9/04 | (2006.01) |
| H04N 5/76 | (2006.01) |
| G08G 1/123 | (2006.01) |
| G01C 21/00 | (2006.01) |
| G01C 21/30 | (2006.01) |

(52) U.S. Cl. ...................... 348/207.11; 348/61; 348/158; 348/207.99; 348/207.1; 348/231.99; 340/995.24; 701/200; 701/207; 701/208

(58) Field of Classification Search ............... 348/14.16, 348/94–95, 143–160, 207.1–207.11, 211.99, 348/211.2, 231.99, 231.2–231.6, 239, 61; 707/741; 455/412.1; 340/995.24; 701/207–208
See application file for complete search history.

(56) References Cited

U.S. PATENT DOCUMENTS

| 6,023,241 | A | * | 2/2000 | Clapper | 342/357.13 |
| 6,127,945 | A | * | 10/2000 | Mura-Smith | 340/988 |
| 6,133,947 | A | * | 10/2000 | Mikuni | 348/143 |
| 6,282,362 | B1 | * | 8/2001 | Murphy et al. | 386/46 |
| 6,928,230 | B2 | * | 8/2005 | Squibbs | 386/46 |
| 6,957,073 | B2 | * | 10/2005 | Bye | 455/456.1 |
| 7,408,665 | B2 | * | 8/2008 | Watanabe et al. | 358/1.15 |
| 7,472,134 | B2 | * | 12/2008 | Kaku | 707/104.1 |
| 7,627,420 | B2 | * | 12/2009 | Ujino | 701/200 |

(Continued)

FOREIGN PATENT DOCUMENTS

JP  2003-78804 A  3/2003

*Primary Examiner* — Jason Chan
*Assistant Examiner* — Michael Osinski
(74) *Attorney, Agent, or Firm* — Birch, Stewart, Kolasch & Birch, LLP

(57) ABSTRACT

An image capturing system can provide an image having the desirable composition captured by an image capturing apparatus to the user is provided.

The image capturing system includes: an image capturing unit; a composition storage section for storing a plurality of compositions of the image captured by the image capturing unit; plurality of position indication units for indicating a position at which a main subject should be located in order to capture an image having the composition stored in the composition storage section; and a composition presentation section for presenting the composition of the image captured by the image capturing unit for the plurality of position indication units when the main subject is located at the position indicated by the position indication unit. The image capturing unit is fixedly installed in a predetermined position. The plurality of position indication units have a plurality of position indication mark units drawn on the positions at which the main subject should be located in each of the plurality of compositions stored in the composition storage section.

14 Claims, 16 Drawing Sheets

U.S. PATENT DOCUMENTS

| | | | |
|---|---|---|---|
| 7,941,271 B2* | 5/2011 | Ofek | 701/211 |
| 2002/0085111 A1* | 7/2002 | Heiman | 348/333.01 |
| 2002/0154213 A1* | 10/2002 | Sibyama et al. | 348/47 |
| 2003/0043283 A1* | 3/2003 | Yamamoto | 348/231.3 |
| 2004/0012702 A1* | 1/2004 | Ishige | 348/333.12 |
| 2004/0030493 A1* | 2/2004 | Pechatnikov et al. | 701/208 |
| 2004/0109199 A1* | 6/2004 | Tsubaki | 358/1.15 |
| 2004/0141063 A1* | 7/2004 | Maeda et al. | 348/207.99 |
| 2004/0183918 A1* | 9/2004 | Squilla et al. | 348/211.2 |

* cited by examiner

IMAGE CAPTURING SYSTEM AND IMAGE CAPTURING METHOD

CROSS REFERENCE TO RELATED APPLICATION

This application claims priority from Japanese Patent Applications Nos. 2004-374689 filed on Dec. 24, 2004 and JP2004-374690 filed on Dec. 24, 2004, the contents of which are incorporated herein by reference.

BACKGROUND OF THE INVENTION

1. Field of the Invention

The present invention relates to an image capturing system and an image capturing method.

2. Related Art

Generally, as a system for capturing images of users using the camera installed in such a theme park, a system in which images are captured by a camera according to an instruction from a shutter device held by the user is known as described in Japanese Patent Application Publication No. 2003-78804, for example. In the system, an alarm tone is generated from the shutter device held by the user when the user arrived at around the snapping spot of the camera installed in such as a flower garden. After perceiving the alarm tone, the user pushes the shutter button of the shutter device to capture an image using the camera. Thereby the user can capture the image using the camera at the desired shutter timing.

However, in such system, a user can not easily recognize the snapping spot until the user arrives at around the snapping spot. Additionally, when a user wants to take a picture against a background of the whole notable building in a theme park, the user can not correctly know whether the user is on the position allowing the user to capture an image with the best composition in the snapping point, for example. Particularly, when it is intended to capture the image of a plurality of persons, each person can not easily know where they should stand to be photographed at the best position. Therefore, the notable building may be hidden by the user depending on the user's position. Then, the user cannot easily acquire the image with the desired composition.

SUMMARY OF THE INVENTION

Thus, the object of the present invention is to provide an image capturing system and an image capturing method which can solve the above-described problems. This object is achieved by combining the features recited in independent claims. Then, dependent claims define further effective specific example of the present invention.

The image capturing system according to a first aspect of the present invention includes an image capturing unit, a composition storage section for storing a plurality of compositions of images captured by the image capturing unit, a plurality of position indication sections for indicating the position at which a main subject should be located in order to capture the image having the composition stored in the composition storage section and a composition presentation section for presenting the composition of an image captured by the image capturing unit for each of the plurality of position indication sections when the main subject is located at the position indicated by the position indication section.

The image capturing unit is fixedly installed at a predetermined position. The plurality of position indication units may have a plurality of position indication mark units drawn on the positions at which the main subjects should be located in each of the plurality of compositions stored in the composition storage section. The composition storage section stores a plurality of compositions depending on the number of main subjects. The plurality of position indication mark units may be drawn on the positions depending on the number of main subjects, respectively. The position indication mark units may indicate the position at which the main subject should be located and the direction of the image capturing unit. The composition presentation section may be a plurality of composition images drawn on near the plurality of position indication mark units in association with each of the plurality of position indication mark units.

The image capturing system may further include a portable unit held by the main subject. The composition presentation section may transmit the composition of the captured image stored in the composition storage section to the portable unit and cause the portable unit to display the composition.

The image capturing system may further include a plurality of antenna units provided corresponding to each of the plurality of position indication mark units, for receiving a composition transmission request from the portable unit by radio signals and a composition selection section for selecting the composition of the image captured by the image capturing unit among the plurality of compositions stored in the composition storage section when the main subject is located at the position on which the position indication mark unit corresponding to the antenna unit is drawn. The composition presentation section may transmit the composition of the captured image selected by the composition selection section to the portable unit and cause the portable unit to display the same.

The image capturing system according to a second aspect of the present invention includes an image capturing unit, a composition determination section for determining the composition of an image to be captured by the image capturing unit, a position identification section for identify at least one of the position of the image capturing unit and the position of the main subject and a position presentation section for presenting at least one of the position of the image capturing unit and the position of the main subject identified by the position identification section.

The image capturing system according to the second aspect of the present invention may further includes a composition storage section for storing a plurality of compositions in which a background image and the position of the main subject in the background is identified. The composition determination section may select the composition selected by the user among the plurality of compositions stored in the composition storage section. Additionally, the image capturing system according the second aspect of the present invention may further include an image capturing unit information storage section for storing information indicative of the type of the image capturing unit, an image capturing condition determination section for determining the image capturing condition of the image capturing unit based on the composition determined by the composition determination section and the information indicative of the type of the image capturing unit stored in the image capturing unit information storage section and an image capturing condition presentation section for presenting the image capturing condition determined by the image capturing condition determination section.

The image capturing unit may be fixedly installed at a predetermine position. The composition storage section may store a plurality of compositions in the image captured by the image capturing system. In the plurality of compositions, the position or size of each main subject is different from each other. The position identification section may identify the position of the main subject based on the position or size of the main subject in the composition determined by the composition determination section. The position presentation section may present the position of the main subject identified by the position identification section.

The image capturing system according to the second aspect of the present invention may further include a position storage section for storing the position of the main subject in association with the plurality of composition stored in the composition storage section and a mark unit provided at the position of the main subject stored in the position storage section. The position identification section may select the position of the main subject stored in the position storage section in association with the composition determined by the composition determination section. The position presentation section may present the information which identifies the mark unit provided at the position of the main subject selected by the position identification section.

The image capturing system according to the second aspect of the present invention may further include a portable unit held by the main subject and a portable unit detection section being capable of receiving within a predetermine region including the mark unit, for receiving the radio signal outputted from the portable unit and detecting that the portable unit is located in a predetermined region. The position presentation section may present information which identifies the mark unit provided at the position of the main subject selected by the position identification section when the portable unit detection section detects that the portable unit is located in the predetermined region.

The mark unit is drawn on the position of the main subject selected by the position identification section along with the information which identifies the mark unit. The position presentation section may transmit the information which identifies the mark unit provided at the position of the main subject selected by the position identification section to the portable unit and cause the portable unit to display the same. The mark unit may have a light emitting section for emitting light. The position presentation section may illuminate with the light the mark provided at the position of the main subject selected by the position identification section.

The image capturing system according to the second aspect of the present invention may further include a map image storage section for storing a three-dimensional map image. The composition determination section may determine a composition including the background image of the main subject. The position identification section may compare the background image of the main subject included in the composition determined by the composition determination section with the three-dimensional map image stored in the map image storage section to identify the position of the image capturing unit.

The image capturing system according to the second aspect of the present invention may further include a position acquiring section for acquiring one of the position to which the image capturing unit is fixed and the position to which the main subject is fixed near the position presented by the position presentation section and a composition redetermination section for determining again the composition of an image to be captured by the image capturing unit based on the composition determined by the composition determination section, the three-dimensional map image stored in the map image storage section and the position acquired by the position acquiring section. The position identification section may identify the other one of the position of the image capturing unit and the position of the main subject based on the composition determined by the composition redetermination section.

The position acquiring section may acquire the position to which the image capturing section is fixed near the position presented by the position presentation section. The composition redetermination section may determine a composition which allow the image capturing unit to capture the main subject and the other subjects in the positional relationship approximately same as the positional relationship between the main subject and the other subjects in the composition determined by the composition determination section based on the composition determined by the composition determination section, the three-dimensional map image stored in the map image storage section and the position of the image capturing unit acquired by the position acquiring section. The position identification section may identify the position of the main subject based on the composition determined by the composition redetermination section.

The position acquiring section may acquire the position to which the main subject is fixed near the position presented by the position presentation section. The composition redetermination section may determine a composition which allow the image capturing unit to capture the main subject and the other subject in the positional relationship approximately same as the positional relationship between the subject and the other subjects in the composition determined by the composition determination section based on the composition determined by the composition determination section, the three-dimensional map image stored in the map image storage section and the position of the main subject acquired by the position acquired section. The position identification section may identify the position of the image capturing unit based on the composition determined by the composition redetermination section.

The image capturing system according to a third aspect of the present invention includes an image capturing unit fixedly installed in a predetermined position, and position indication mark units for indicating the position at which the main subject should be located in order to acquire the captured image having the predetermined composition captured by the capturing section, respectively. Each of the position indication mark unit is provided in the region within which the position indication mark unit is set in the frame of the image captured by the image capturing unit and not shown on the image captured by the image capturing unit when the main subject is located thereon.

The image capturing system according to the third aspect of the present invention may further include a facial image storage section for storing the facial image of the main subject, a facial position storage section for storing the position at which the face of the main subject should be shown on the captured image, an image comparison section for comparing the captured image with the facial image and a captured image acquiring section for acquiring the image captured by the image capturing unit when it is determined that the facial image is shown on the captured image based on the comparison result by the image comparison section.

The image capturing system according to the third aspect of the present invention may further include a image capturing control mark unit provided between the image capturing unit and the position indication mark units, a mark shown on determination section for determining whether the image capturing control mark unit is shown on the captured image and a captured image acquiring section for acquiring the image captured by the image capturing unit when the mark shown on determination section determines that the image capturing control mark unit is shown on the captured image and vice versa.

An image capturing method according to a fourth aspect of the present invention includes the steps of: capturing an image by an image capturing unit; storing a plurality of compositions of the image captured by the image capturing unit; indicating the position at which a main subject should position in order to capture the image having the composition stored in the storing step by a plurality of position indication sections; and presenting the composition of the image captured by the image capturing unit for each of the plurality of position indication units when the main subject is located at the position indicated by the position indication section.

An image capturing method according to a fifth aspect of the present invention includes the steps of: capturing an image by an image capturing unit; determining the composition of an image to be captured by the image capturing unit; identifying at least one of the position of the image capturing unit and that of a main subject based on the composition determined in the composition determining step; and presenting at least one of the position of the image capturing unit and that of the main subject based on the composition determined in the composition identifying step.

An image capturing method according to a sixth aspect of the present invention includes the steps of: capturing an image by an image capturing unit fixedly installed at a predetermined position; and indicating a position at which a main subject should be located in order to capture an image having a predetermined composition captured by the image capturing unit using a position indication mark unit provided within an image capturing region by the image capturing unit, where, the position indication mark unit is not shown on the image captured by the image capturing unit when the main subject is located thereon.

Here, all necessary features of the present invention are not listed in the summary of the invention. The sub-combinations of the features may become the invention.

According to the present invention, an image having the desirable composition, which is captured by an image capturing apparatus can be provided to the user.

DETAILED DESCRIPTION OF THE INVENTION

Figure 1:
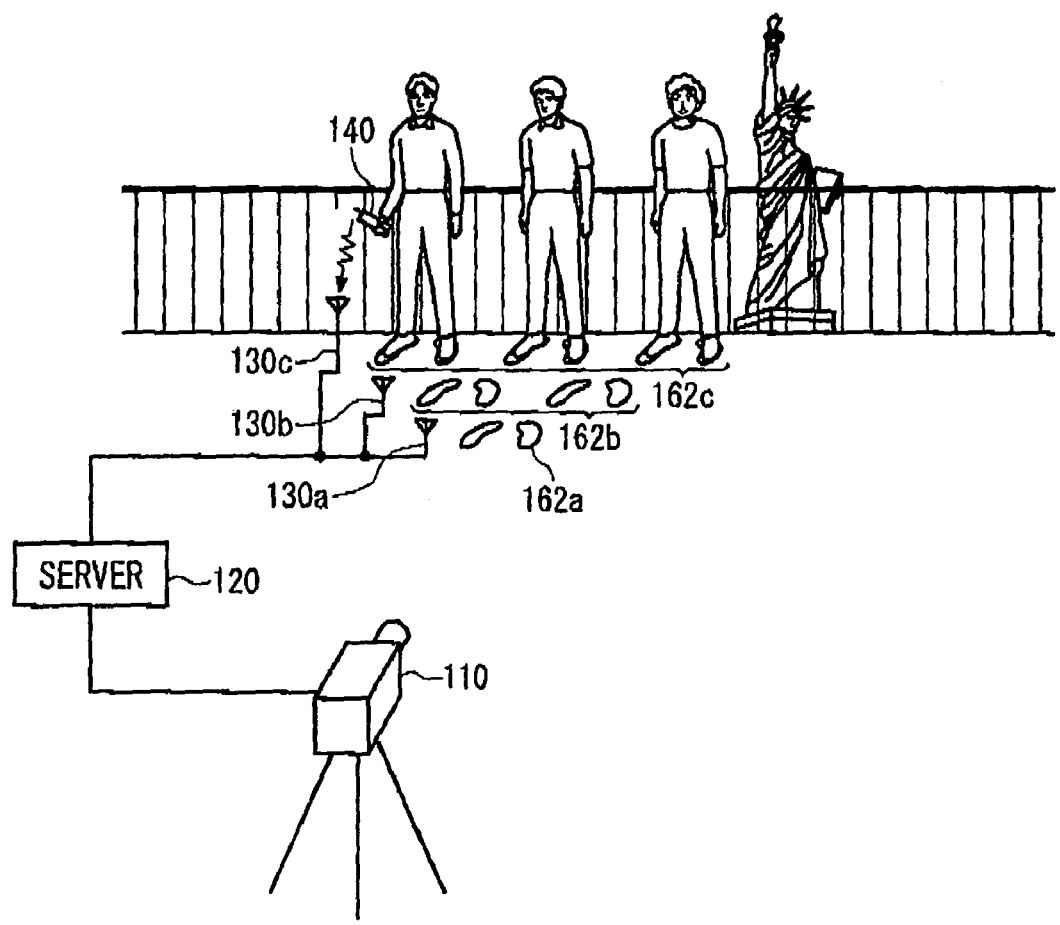
FIG. 1 shows an example of the environment for the usage of an image capturing system according to an embodiment of the present invention.

Hereinafter, the present invention will now be described through preferred embodiments. The embodiments do not limit the invention according to claims and all combinations of the features described in the embodiments are not necessarily essential to means for solving the problems of the invention.

For the sake of clarity and understanding, identical components having identical functions in each of the accompanying drawings have been marked with the same reference numerals throughout each of the several Figures illustrated herein.

FIG. 1 shows an example of an environment for the usage of the image capturing system according to a first embodiment of the present invention. The image capturing system captures pictures of users who play in an amusement park and provides the pictures to the users. An image capturing unit 110 is installed at the position at which the user image can be captured against a background of a notable statue of the amusement park. A plurality position indication mark units (162a-c, hereinafter generally referred to as 162) are drawn on the ground at which the user should be located in order to capture the image of an user against a background of the notable statue in the appropriate composition. The position indication mark units 162a, 162b and 162c indicate the positions at which the subject person should be located in order to obtain the image having the best composition, where, the position indication mark units 162a, 162b and 162c are set for one subject person, two subject persons and three subject persons, respectively.

A portable unit 140 held by the user transmits signals for capturing images using the image capturing unit 110 based on a user operation. A plurality of antenna units (130a-c, hereinafter generally referred to as 130) are provided near the position indication mark units 162, respectively. The antenna unit 130a, 130b and 130c are provided to receive the signal transmitted from the portable unit 140 when the user stands on the position indication mark unit 162*a*, 162*b* and 162*c*, respectively. A server 120 receives the signal generated by the portable unit 140 from the antenna units 130 by radio communication. The server 120 causes the image capturing unit 110 to capture the image of the user based on the signal received by the antenna units 130.

The server 120 acquires the image captured by the image capturing unit 110 and stores the same in directories provided for each user, such as directories associated with each portable unit 140. Then, the user receives the image stored in the saver 120 for each user when the user leaves the amusement park. The server 120 may transmit the images stored in the server 120 to the portable unit 140 to provide the same to the users. Here, the portable unit 140 may be an PDA (personal digital assistant) such as a cellular phone held by the user and may be a rental PDA provided by the amusement park.

The image capturing system according to the present embodiment can notify the user of the position at which the user should be located in order to capture the image in the best composition by the position indication mark units 162.

Figure 2:
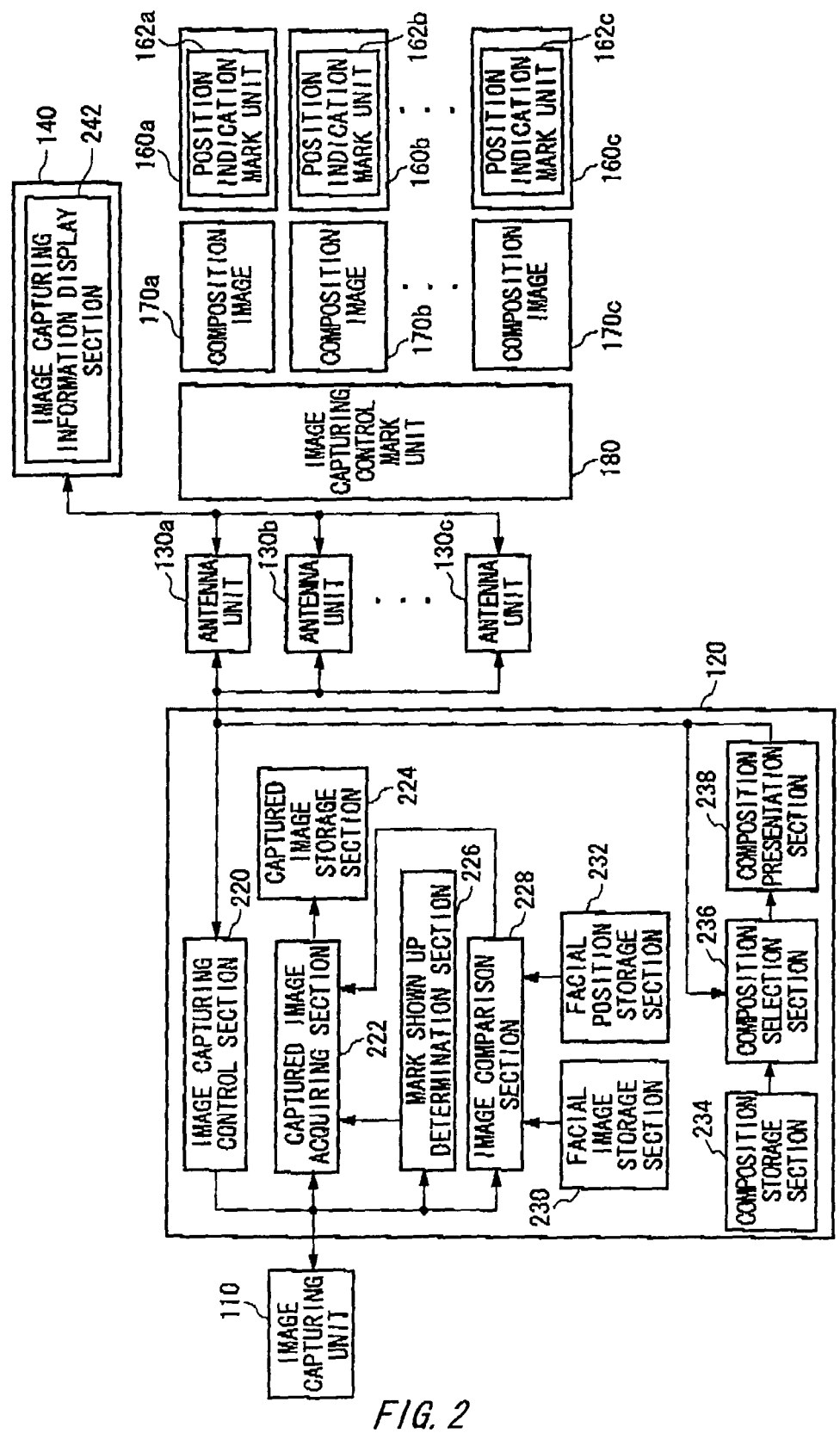
FIG. 2 shows an example of a block configuration of the image capturing system according to an embodiment of the present invention.

FIG. 2 shows an example of a block configuration of the image capturing system according to the present embodiment. The image capturing system includes the image capturing unit 110, the server 120, the antenna units 130, an image capturing control mark unit 180, composition images (170*a*-*c*, hereinafter generally referred to as 170), the position indication units (160*a*-*c*, hereinafter generally referred to as 160) and the portable unit 140. The server 120 has a composition storage section 234, a composition selection section 236, a composition presentation section 238, a facial image storage section 230, a facial position storage section 232, an image comparison section 228, a mark shown on determination section 226, a captured image acquiring section 222, a captured image storage section 224 and an image capturing control section 220. The portable unit 140 has an image capturing information display section 242. Each of the position indication units have position indication mark units 162.

Here, only the image capturing unit 110 may installed at the position at which the subject can be captured among the components of the image capturing system and then, the server 120 may be embodied in a computer provided at the position different from the position of the image capturing unit 110, for example.

The portable unit 140 is held by a main subject captured by the image capturing unit 110. Then, the portable unit 140 transmits the signal to remotely control the image capturing unit 100 by radio communication. For example, the portable unit 140 transmits to the image capturing unit 110 the signal to instruct on image-capturing and transmits to the server 120 the signal to request the composition of the subject.

The antenna units 130 receives the signal from the portable unit 140 by a radio signal. The image capturing control section 220 controls the image capturing unit 110 based on the signal received by the antenna units 130. For example, the image capturing control section 220 instructs the image capturing unit 110 on image-capturing when the image capturing control section 220 is instructed by the portable unit 140 on the mage-capturing.

The image capturing unit 110 receives light from the subject by an image capturing device such as a CCD to capture the image of the subject. Then, the captured image acquiring section 222 acquires the image captured by the image capturing unit 110 and stores the same in the captured image storage section 224. Here, the image capturing unit 110 may fixedly installed at a predetermined position. Additionally, the image capturing unit 110 may continuously capture the subject at a predetermined time interval. The image capturing unit 110 may store the predetermined number of images obtained by continuously capturing. Then the captured image acquiring section 222 may acquire the image captured at the timing proximate to the instructed time for capturing by the image capturing unit 110 among the captured images stored in the image capturing unit 110.

The server 120 may transmit the captured image stored in the captured image storage section 224 to the portable unit 140. Then, the portable unit 140 may display the captured image received from the server 120 on the image capturing information display section 242 to present to the user.

The composition storage section 234 stores a plurality of compositions of the image captured by the image capturing unit 110. Then, each of the position indication units 160 indicate the position at which the main subject is should be located in order to capture the image having the plurality of compositions stored in the composition storage section 234, respectively.

Each of the position indication mark units 162 indicates the position at which the main subject should be located in order to acquire the image having a predetermined composition captured by the image capturing unit 110. Specifically, the position indication mark units 162 are drawn on the position at which the main subject should be located in each of the plurality of compositions stored in the composition storage section 234. The user can obtain the captured image having the composition stored in the composition storage section 234 by capturing the image at the positions on which the position indication mark units 162 are drawn.

The composition presentation section 238 presents the composition of the image captured by the image capturing unit 110 for each of the plurality of position indication units 160 when the main subject is located at the position indicated by the position indication units 160. Specifically, the composition presentation section 238 presents for each of the position indication sections 160 the composition selected by the composition selection section 236 among the compositions stored in the composition storage section 234.

For example, when the composition selection section 236 receives a composition transmission request for transmitting the composition from the portable unit 140, the composition selection section 236 selects the composition of the image captured by the image capturing unit 110 among the plurality of compositions stored in the composition storage section 234 provided that the main subject is located at the position on which the position indication mark unit 162 corresponding to the antenna unit 130 is drawn. Then, the composition presentation section 238 transmits the composition of the captured image selected by the composition selection section 236 to the portable unit 140 and causes the image capturing information display section to display the same.

The plurality of composition images 170 are drawn near the plurality of position indication mark units 162 in association with each of the plurality of position indication mark units 162, respectively. Here, the composition images 170 may be an example of the composition presentation section 238.

The facial image storage section 230 stores the facial image of the main subject. For example, the facial image storage section 230 previously stores the facial image of the user captured at entering the amusement park. The facial position storage section 232 stores the position at which the user's face should be shown on the captured image. Then, the image comparison section 228 compares the image including the position at which the face of the main subject should be shown on the captured image with the facial image stored in the facial image storage section 230. Then, the captured image acquiring section 222 acquires the image captured by the image capturing unit 110 when it is determined that the facial image stored in the facial position storage section 232 is included in the captured image based on the comparison result by the image comparison section 228.

The image capturing control mark unit 180 is provided between the image capturing unit 110 and the position indication mark units 162. The mark shown on determination section 226 determines whether the image capturing control mark unit 180 is shown on the image captured by the image capturing unit 110. Then, when the mark shown on determination section 226 determines that the image capturing control mark unit 180 is shown on the captured image, the captured image acquiring section 222 acquires the image captured by the image capturing unit 110. Alternatively, when the mark shown on determination section 226 determines that the image capturing control mark unit 180 is not shown on the captured image, the captured image acquiring section 222 does not acquire the image captured by the image capturing unit 110.

Figure 3:
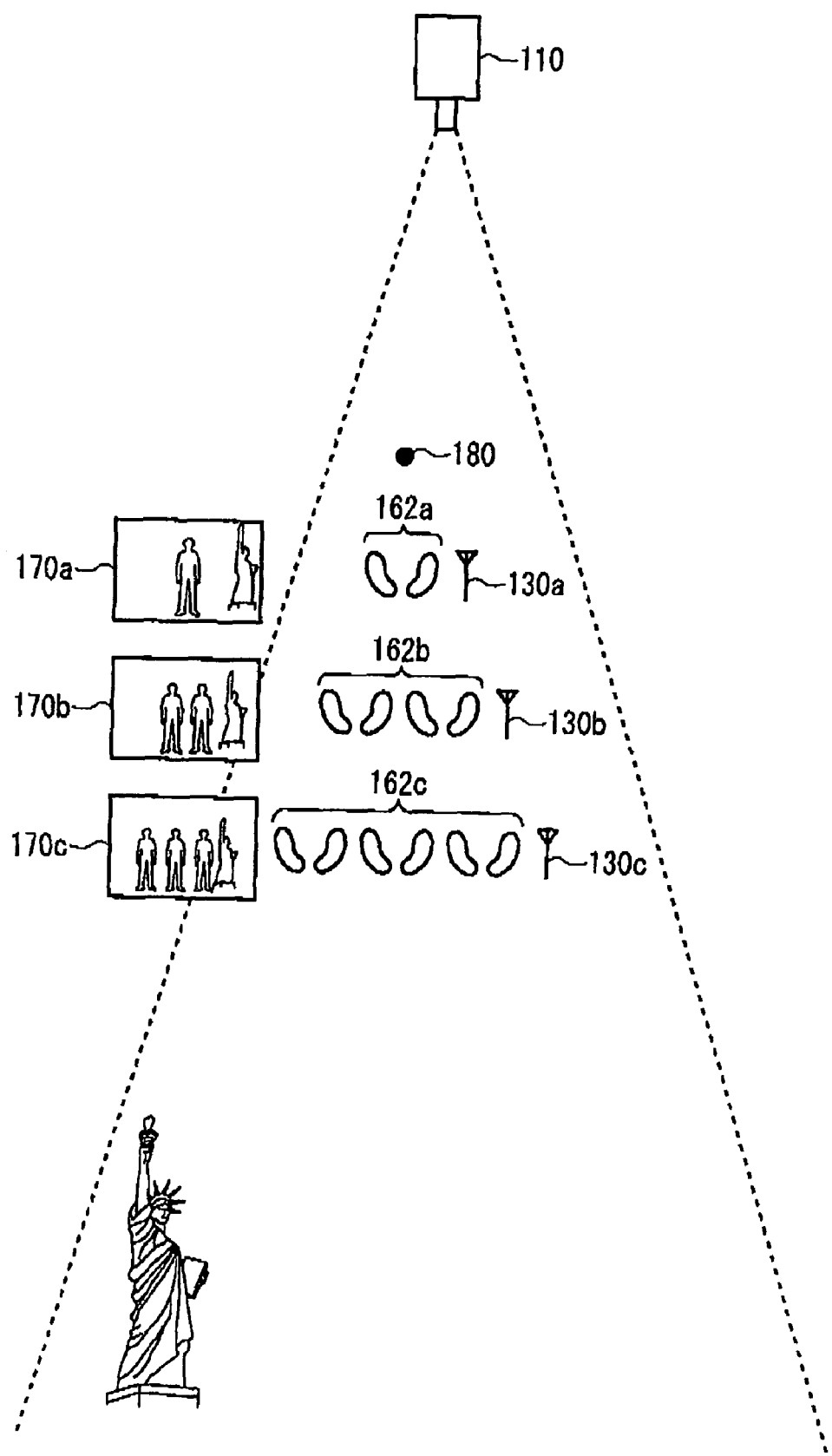
FIG. 3 shows an example of an image capturing position at which a user is located according to an embodiment of the present invention.

FIG. 3 shows an example of an image capturing position at which a user is positioned according to the present embodiment. The position indication mark units 162 are drawn on the positions depending on the number of main subjects, respectively. Specifically, the position indication mark unit 162a, 162b and 162c are drawn on the position at which the main subject should be located in order to obtain the image having the best composition captured by the image capturing unit 110, where, the position indication mark units 162a, 162b and 162c are set for one subject person, two subject persons and three subject persons, respectively.

Additionally, the position indication mark units 162 may indicate the position at which the main subject should be located and the direction of the image capturing unit 110. For example, the position indication mark units 162 may some marks in the shape of a foot of humans which are drawn on the ground at the position at which the user should be located. In this case, the face of the person who stands on the mark would face toward the direction of the image capturing unit 110. Additionally, the position indication mark units 162 may include directional arrows indicative of the direction of the image capturing unit 110.

Here, the position indication mark units 162 may be drawn within the image capturing region captured by the image capturing unit 110. Additionally, the position indication mark units 162 may be provided on the position at which the position indication mark units 162 are not shown on the image captured by the image capturing unit 110 when the main subject is located thereon. For example, the main subject exists on the position at which the position indication mark units 162 are provided, so that the position indication mark units 162 are hidden by the main subject, thereby the position indication mark units 162 are not shown on the captured image. Specifically, any user stands on the position at which the position indication mark units 162 are provided, so that the position indication mark units 162 are hidden by the feet of the user, thereby the position indication mark units 162 are not shown on the captured image. For example, the position indication mark units 162 may be marks having the size smaller than that of a foot of humans.

The position indication units 160 may be a component indicated on the ground by lighting by the image capturing unit 110. For example, the position indication units 160 may indicate the position at which the main subject is located by emitting light by a light emitting device fixed on the position at which the main subject should be located. Additionally, the position indication units 160 may be luminescence material applied on the position at which the main subject should be located. Then, the position indication units 160 may indicate the position at which the main subject is located by lighting the luminescence material with an ultraviolet flash.

The composition images 170a, 170b and 170c are drawn for each of the position indication mark units 162a, 162b and 162c, respectively. The composition images 170 may be drawn near the position indication mark unit 162 corresponding to each of the composition images 170. The user can recognize the composition of the image captured by the image capturing unit 110 before capturing the image when the image is captured at the position of the position indication mark units 162 by the composition image 170 drawn near the position indication mark unit 162.

The antenna units 130 are provided corresponding to each of the plurality of position indication mark units 162, respectively. Then, the antenna units 130 receive the composition transmission request from the portable unit 140 by a radio signal.

Here, the region within which the antenna units 130 can receive the composition transmission request may be a region within which the user located on the corresponding position indication mark unit 162 can receive the composition transmission request from the portable unit 140 held by the user. Further, the region within which the antenna units 130 can receive the composition transmission request may be a region within which the composition transmission request transmitted from only the portable unit 140 held by the user located on the corresponding position indication mark unit 162 can be received.

Additionally, the antenna units 130 may receive the composition transmission request when the user is located on the corresponding position indication units 160 and may not receive the composition transmission request when the user is not located on the corresponding position indication unit 160. For example, any switch for controlling the operation of receiving the composition transmission request by the antenna units 130 may be provided near the position indication units 160. Then, the operation of receiving the composition transmission request by the antenna units 130 may be executed provided that the switch is turned on by an operation by the user located on the position indication unit 160 and a pressure by the weight of the user.

Additionally, the antenna units 130 may be provided near the positions on which the position indication units 162 are drawn. The antenna units 130 may be embedded in the ground so as not to be shown on the image captured in the image capturing unit 110. Further, the antenna units 130 are provided outside of the image capturing region captured by the image capturing unit 110. Furthermore, the antenna units 130 may be provided on the position higher than the ground, such as the wall of a building.

Here, the composition storage section 234 may store a plurality of compositions depending on the number of main subjects. For example, the composition storage section 234 stores the images similar to the composition images 170 in association with the position indication mark units 162. Then, the composition selection section 236 selects the composition of the image captured by the image capturing unit 110 among the plurality of compositions stored in the composition storage section 234 provided that the main subject is located at the position on which the position indication mark unit 162 corresponding to the antenna unit 130 is located when the antenna units 130 receives the composition transmission request.

For example, when the user located at the position on which the position indication mark unit 162c transmits the composition transmission request using the portable unit 140, the antenna unit 130c corresponding to the position indication mark unit 162c receives the composition transmission request by the signal. The composition selection section 236 selects the composition of the captured image stored in association with the position indication mark unit 162c corresponding to the antenna unit 130c which received the signal. Here, the composition selection section 236 may select the composition of the composition image stored in association with the position indication mark unit 162c corresponding to the antenna unit 130c which received the composition transmission request at the maximum intensity when the plurality of antenna units 130 receive the composition transmission request transmitted from the portable unit 140.

The image capturing control mark unit 180 is drawn on the ground between the image indication mark units 162 and the image capturing unit 110. The captured image acquiring section 222 acquires the captured image when the image capturing control mark unit 180 is shown on the image captured by the image capturing unit 110.

Additionally, image capturing buttons for instructing the image capturing unit 110 on image-capturing may be provided near for each of the position indication marks 162, respectively. For example, the image capturing buttons may be provided under user's feet positioned on each of the position indication mark units 162. Then, the image capturing unit 110 may identify the position indication mark unit 162 corresponding to the image capturing button operated by the user's foot to capture the image in the composition according to the number of main subjects indicated by the position indication mark unit 162. Additionally, the image capturing unit 110 may capture an image provided that the number of users corresponding to the number of main subjects indicated by the position indication mark units 162 are at located on the position indication mark units 162. For example, the image capturing buttons may be provided at each of the positions on which the main subjects indicated by the position indication mark units should be located, respectively. Then, the image capturing unit 110 may capture an image provided that all of the image capturing buttons provided at the positions at which the main subjects indicated by the position indication mark units 162 should be located are operated by the number of users corresponding to the number of the main subjects indicated by the position indication mark units 162.

Figure 4:
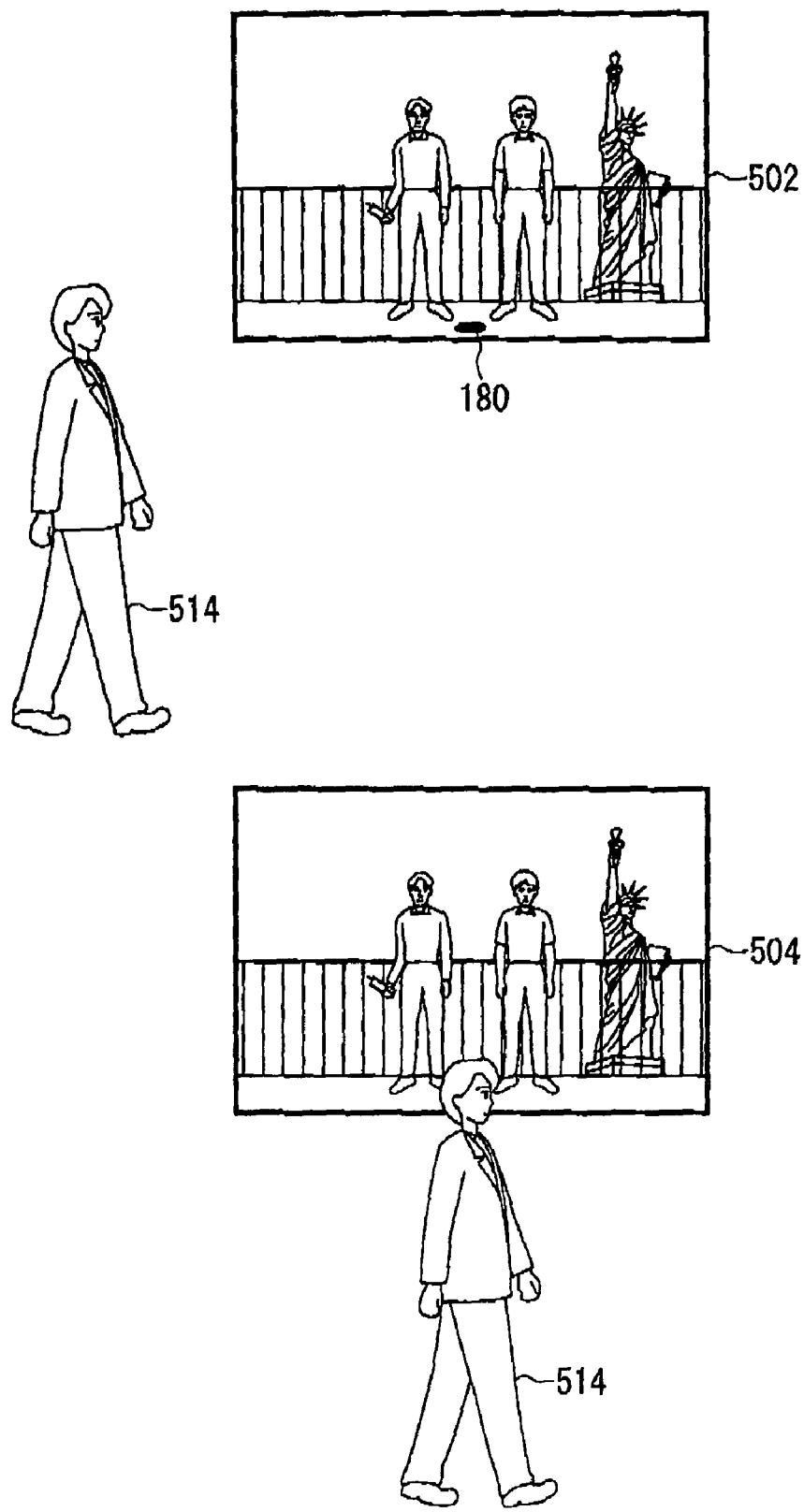
FIG. 4 shows an example of the image captured by an image capturing unit 110 according to an embodiment of the present invention.

FIG. 4 shows an example of the image captured by an image capturing unit according to the present embodiment. The image 502 represents an example of the image captured by the captured image acquiring section 222. The image 504 represents an example of the image being not captured by the captured image acquiring section 222. The mark shown on determination section 226 determines whether the image capturing control mark unit 180 is shown on the image captured by the image capturing unit 110. Here, the mark shown on determination section 226 may previously stores the position in the image captured by the image capturing unit 110, on which the image capturing control mark unit 180 is shown in association with each of the compositions of the images captured by the image capturing unit 110. Then the mark shown on determination section 226 determines whether the image capturing control mark unit 180 is shown on the position of the captured image on which the image capturing control mark unit 180 should be shown. The captured image acquiring section 222 acquires the image captured by the image capturing section 110 when the mark shown on determination section 226 determines that the image capturing control mark unit 180 is shown on the image.

Meanwhile with reference to the image 504 in FIG. 4, the image capturing control mark unit 180 is not shown on the image 504 because the image capturing control mark unit 180 is hidden by a person 514. In this case, the mark shown on determination section 226 determines that the image capturing mark unit 180 is not shown on the position in the image on which the image capturing control mark unit 180 should be shown. Then, the captured image acquiring section 222 does not acquire the image captured by the image capturing unit 110. Therefore, the user can obtain the captured image in which any undesirable subject is not shown in front of the user.

Additionally, the mark shown on determination section 226 may determine whether any undesirable subject is shown on the captured image using the captured image obtained by reducing the depth of field of the image capturing unit 110. For example, the image capturing control section 220 causes the image capturing unit 110 to capture the image with less depth of the field centered on the position indication mark unit 612 corresponding to the antenna unit 130 which received the signal for instructing on image-capturing when the image capturing control section 220 is instructed on image-capturing by the portable unit 140. Then, the captured image acquiring section 222 calculates the special frequency component of the image captured by the image capturing unit 110. Additionally, the captured image acquiring section 222 does not acquire the captured image when the captured image has the intensity more than a predetermined value in the low frequency component less than a predetermined frequency among the calculated special frequency component. Thereby it can be prevented that person different from the user, such as a tourist is shown on the captured image. Therefore, a desirable image can be provided to the user.

Figure 5:
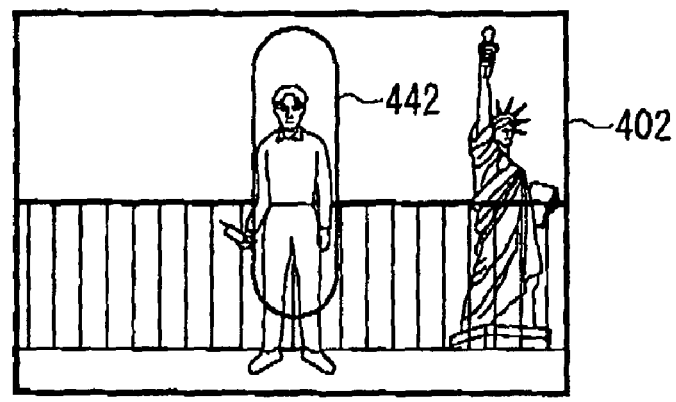
FIG. 5 shows an example of the facial position stored in a facial position storage section 232 according to an embodiment of the present invention.
Figure 5:
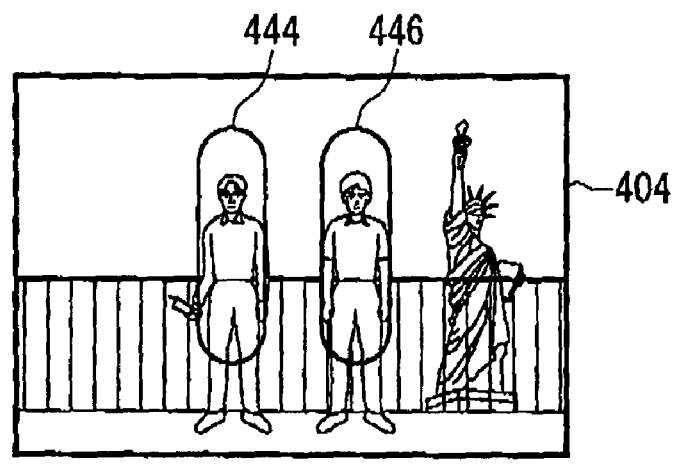
Figure 5:
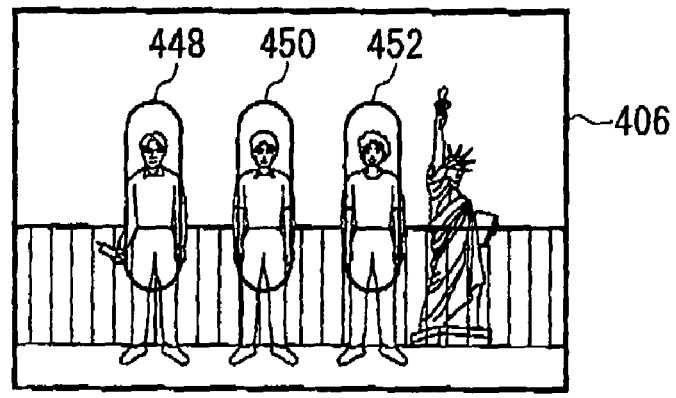

FIG. 5 shows an example of the facial position stored in a facial position storage section 232 according to the present embodiment. A captured image 402, 404 and 406 are examples of the images obtained when persons stand on each of the position indication mark unit 162a, 162b and 162c and the images are captured using the image capturing unit 110. The facial position storage section 232 stores the region within which the face of the person is positioned in the image captured by the image capturing unit 110 when the main subject is located at the position on which the position indication mark units 162 are drawn.

For example, the facial position storage section 232 stores a range 442 within which the user's face who stands on the position indication mark unit 162a is located. The facial position storage section 232 stores ranges (444 and 446) and ranges (448, 450 and 452) within which each of the user's faces who stand on the position indication mark unit 162b and 162c is positioned. Then, the image comparison section 228 determines whether the facial image stored in the facial image storage section 230 is included within the range stored in the facial position storage section 222 in the captured image.

Specifically, the image comparison section 228 compares the outline of the subject extracted from the image within the range 442 in which the facial image is located by an edge extraction with the outline of the facial image stored in the facial image storage section 230 through a pattern matching. The image comparison section 228 compares the facial image within the region including the facial position stored in the facial position storage section 232. Therefore, the image comparison section 228 can more speedily determine whether the person registered in the facial image storage section 230 is located at the position indication units 160 in comparison with when the person's face is extracted from all images captured by the image capturing unit 110.

Additionally, the facial position storage section 232 may store the central coordinate at which the face of the user standing on the position indication mark units 162 is located in the captured image 402. The image comparison section 228 may determine whether any subject matching with the facial image stored in the facial image storage section 230 is located within a predetermined range including the position stored in the facial position storage section 232 in the captured image.

The facial position storage section 232 may calculate the facial position of the user in the captured image for each composition stored in the composition storage section 234 based on a pre-registered user's height information. Additionally, the facial position storage section 232 may store the calculated facial position in association with the facial image stored in the facial image storage section 230. Here, the facial position storage section 232 may determine the range of the user's height based on a pre-registered user's age information and store the facial position calculated based on the determined range of the user's height in association with the facial image stored in the facial image storage section 230. Since the image comparison section 228 may compare the facial image with the captured image within the range determined for each facial image, it can be more speedily determine whether the person of which facial image is registered in the facial image storage section 230 is located on the position indication units 160.

Figure 6:
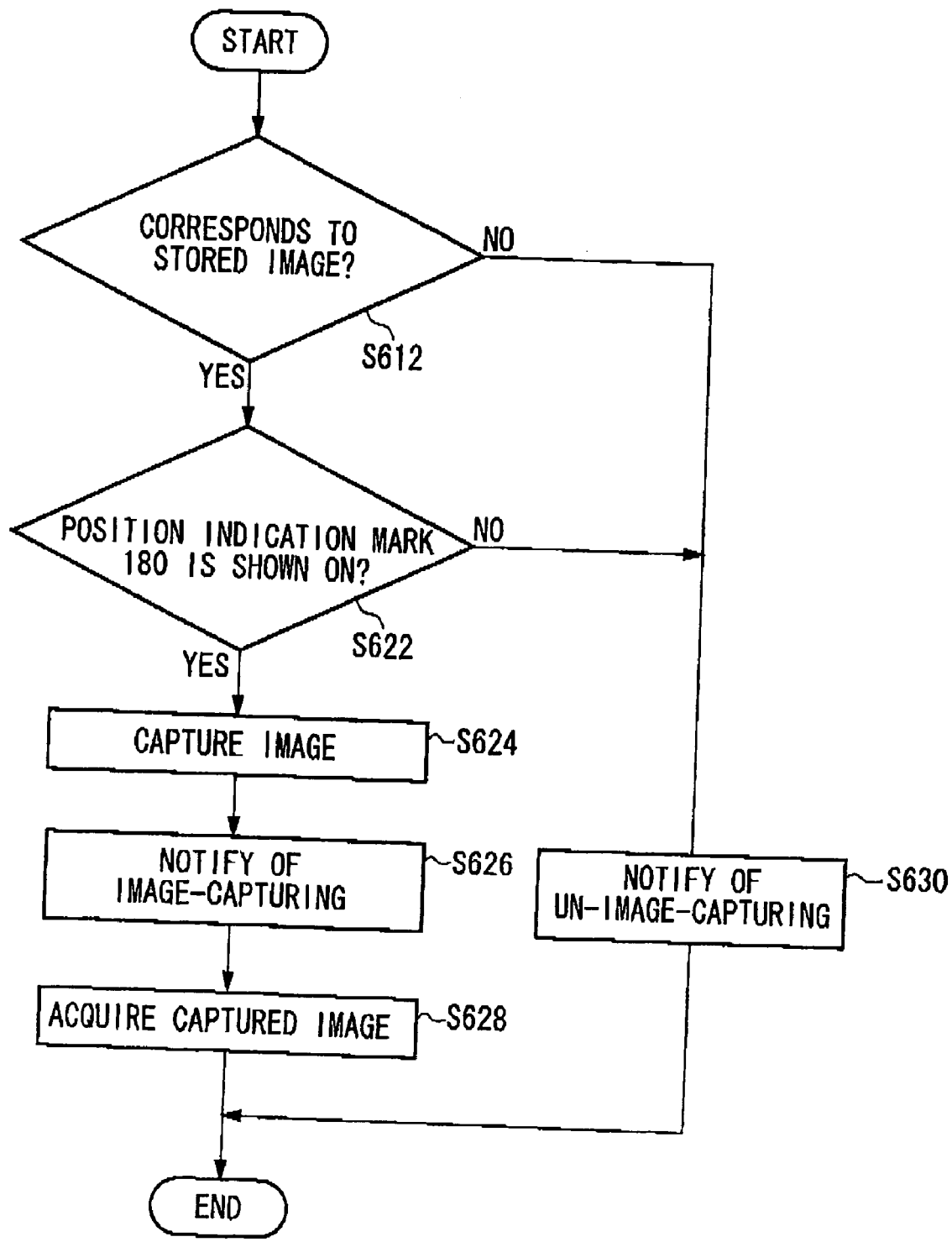
FIG. 6 shows an example of the procedure of the image-capturing using the image capturing unit 110 according to an embodiment of the present invention.

FIG. 6 shows an example of the procedure of the image-capturing using the image capturing unit 110 according to the present embodiment. Instructed on image-capturing by the portable unit 140, the image comparison section 228 acquires the image captured by the image capturing unit 110 and determines whether the facial image stored in the composition storage section 234 is included in the captured image (S612). When the image comparison section 228 determines that the facial image stored in the composition storage section 234 is included in the image captured by the image capturing unit 110 (S612:YES), the mark shown on determination section 226 determines whether the image capturing control mark unit 180 is shown on the image captured by the image capturing unit 110 (S622). When the mark shown on determination section 226 determines that the image capturing control mark unit 180 is shown on the image captured by the image capturing unit 110 (S622:YES), the image capturing unit 110 captures the subject (S624).

Next, the server 120 notifies the user that the image is captured by the image capturing unit 110 (S626). For example, the image capturing unit 110 emits light on capturing the image, so that the user recognizes that the image is captured. Additionally, the server 120 may transmit to the portable unit 140 a signal indicating that the image is captured by the image capturing unit 110. On receiving the signal from the server 120, the portable unit 140 may generate a sound indicating that the image is captured. Additionally, the portable unit 140 may display that the image is captured on the image capturing information display section 242.

Next, the captured image acquiring section 222 acquires the image captured by the image capturing unit 110 (S628), and stores the captured image in the captured image storage section 224. The server 120 may transmit the image stored in the captured image storage section 224 to the portable unit 140. Then, the portable unit 140 may display the captured image received from the server 120 on the image capturing information display section 242.

When the image comparison section 228 determines that the facial image stored in the composition storage section 234 is not included in the image captured by the image capturing unit 110 in S612 (S612:NO), it is notified the user that any image is not captured by the image capturing unit 110 (S630) and the process is terminated. Additionally, when the mark shown on determination section 226 determines that the image capturing control mark unit 180 is not shown on the image captured by the image capturing unit 110 (S622:NO), the process is terminated after S630.

In the S630, the image capturing unit 110 emits light of which color is different from that of the light emitted for notifying that the image is captured by the image capturing unit 110, so that it may be notified the user that any image is not captured. Additionally, the server 120 may transmit to the portable unit 140 a signal indicating that any image is not captured by the image capturing unit 110. Then, on receiving the signal from the server 120, the portable unit 140 may generate a sound indicating to the user that any image is not captured. Further, the portable unit 140 may display that any image is not captured on the image capturing information display section 242.

An example of the process based on the instruction from the portable unit 140 has been described with reference to FIG. 6. Additionally, when the image capturing unit 110 continuously captures the images of the subject, the image captured around the timing instructed by the portable unit 140 may be processed as well as described above. That is to say, the image comparison section 228 may determine whether the facial image stored in the composition storage section 234 is shown on the image captured around the timing instructed by the portable unit 140 among the images continuously captured by the image capturing unit 110. The mark shown on determination section 226 may determine whether the image capturing control mark unit 180 is shown on the image captured around the timing instructed by the portable unit 140 among the images continuously captured by the image capturing unit 110 in S622. Thereby the user can capture images using the image capturing unit 110 by standing on the position indication mark units 162 without operating the portable unit 140.

Here, when the image capturing unit 110 continuously capture the images of the subject, the subject may be captured with the resolution lower than that of the captured image provided to the user. Then, the image comparison section 228 and the mark shown on determination section 226 may make a determination of S612 and S622 to the captured image with the resolution lower than that of the image captured by the image capturing unit 110. Then, in S624, the image capturing unit 110 may capture an image provided to the user with the resolution higher than that of the captured image used for the determination of S612 and S622. In S628, the captured image acquiring section 222 may acquire the captured image with the high resolution captured by the image capturing unit 110 in S624.

The image capturing system according to the present embodiment can notify the user of the position on which the user should be located in order to capture an image having the appropriate composition. Therefore, an image having the desirable composition can be provided to the user.

Figure 7:
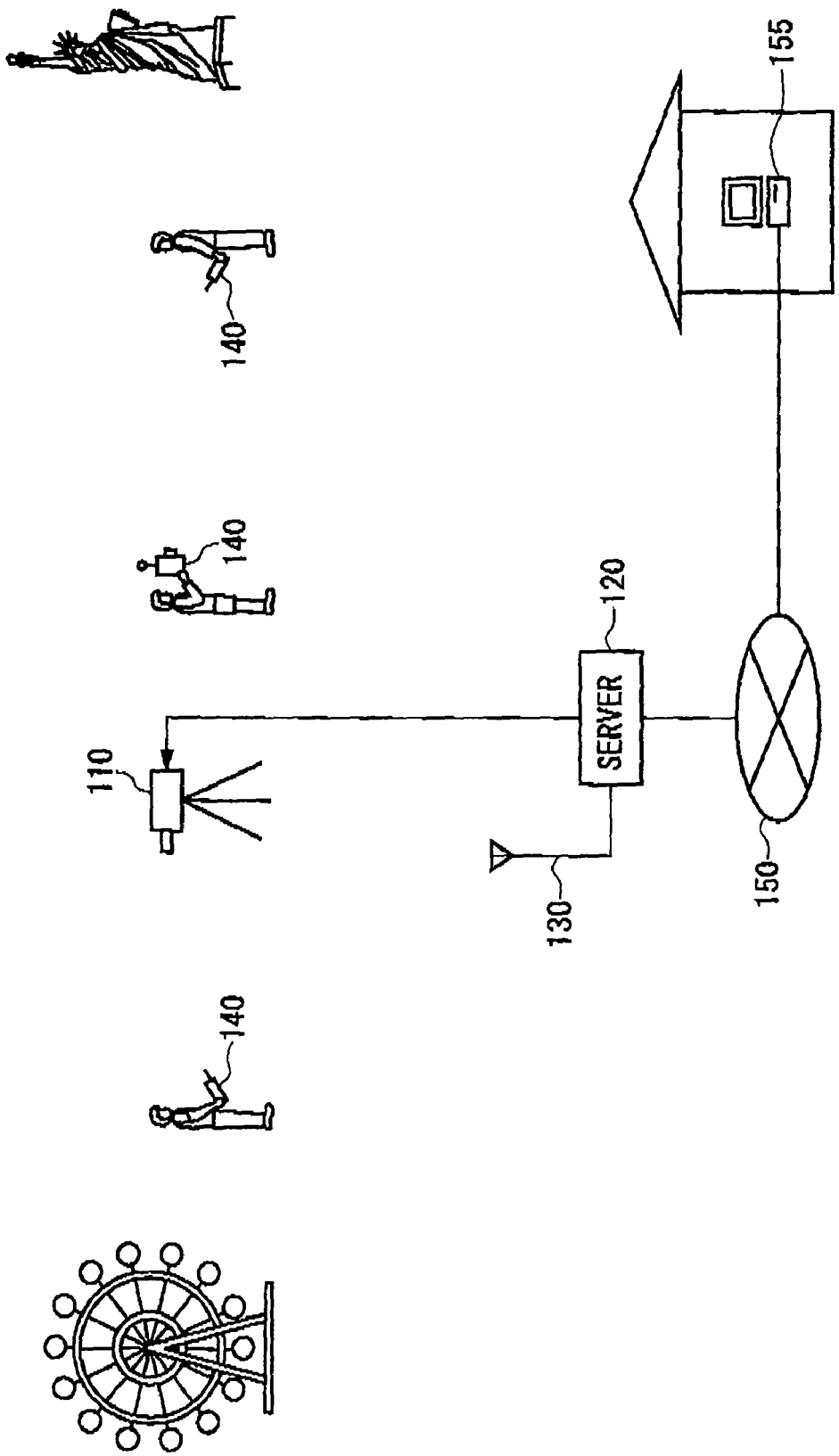
FIG. 7 shows an example of the environment for the usage of an image capturing system according to another embodiment of the present invention.

FIG. 7 shows an example of the environment for the usage of an image capturing system according to a second embodiment of the present invention. The image capturing system captures the picture of the user who plays in the amusement park and provides the picture to the user, for example. The image capturing unit 110 is installed at the position at which the photograph of the user can be captured against a background of Ferris wheel which is one attraction of the amusement park. The portable unit 140 held by the user receives a composition which can be captured by the image capturing unit 110 from the server 120 through the antenna unit 130 and presents the same to the user. Then, the portable unit 140 transmits the composition selected by the user to the server 120 through the antenna unit 130. Then the server 120 transmits a user position at which an image having the composition received from the portable terminal 140 can be captured to the portable unit 140. The user captures the image having the composition selected by the user using the image capturing unit 110 after moving to the position indicated by the portable unit 140.

The server 120 may transmit the position at which the image capturing unit 110 can capture an image having the composition received from the portable unit 140 to the portable unit 140 and present the same to the user. Then the user captures the image having the composition selected of the user's own choice using the image capturing unit 110 located at the position indicated by the portable unit 140. Here, the portable unit 140 held by the user may have an image capturing function as well as the image capturing unit 110. Then user may move to the position of the image capturing unit 110 indicated by the portable unit 140 and capture an image having the composition selected by the user using the portable unit 140.

The server 120 acquires the image captured by the image capturing unit 110 and stores directories provided for each user, such as directories associated with the portable unit 140. Then, the user receives the image stored in the saver 120 for each user when the user leaves the amusement park. The server 120 may transmit the images stored in the server 120 to the portable unit 140 to provide the same to the users. Here, the portable unit 140 may be a PDA, such as a cellular phone held by the user and may be a rental PDA provided by the amusement park.

Additionally, the server 120 may be connected to the communication network 150 such as Internet. The server 120 may cause the user to select a composition through the computer 155 connected to the communication network 150. The server 120 may store the composition selected by the user using the computer 155 in association with identification information for identifying the user, such as an e-mail address and a cellular phone number. Then the server 120 may present the position of the image capturing unit 110 or the position of the user to the portable unit 140 when the server 120 detects that the portable terminal 140 identified by the identification information arrives near the position of the image capturing unit 110 or the position of the user at which the image having the composition associated with the identification information can be captured. Further, the server 120 may present the position of the image capturing unit 110 or the position of the user to the user using the computer 155. Here, the user may receive the image stored for each user in the server 120 using the computer outside of the amusement park.

The image capturing system according to the present embodiment can notify a user of the position at which the user should be located in order to capture an image having the appropriate composition. Additionally, the image capturing system according to the present embodiment can notify the user of the position of the image capturing unit 110 to capture an image having the appropriate composition. Additionally, the use can easily know the position of the image capturing unit 110 or the position at which the user should be located even if the user is positioned far from the position at which the image capturing unit 110 is installed, and is positioned far from the image capturing region by the image capturing unit. Therefore, the user can easily capture an image having the desirable composition.

Figure 8:
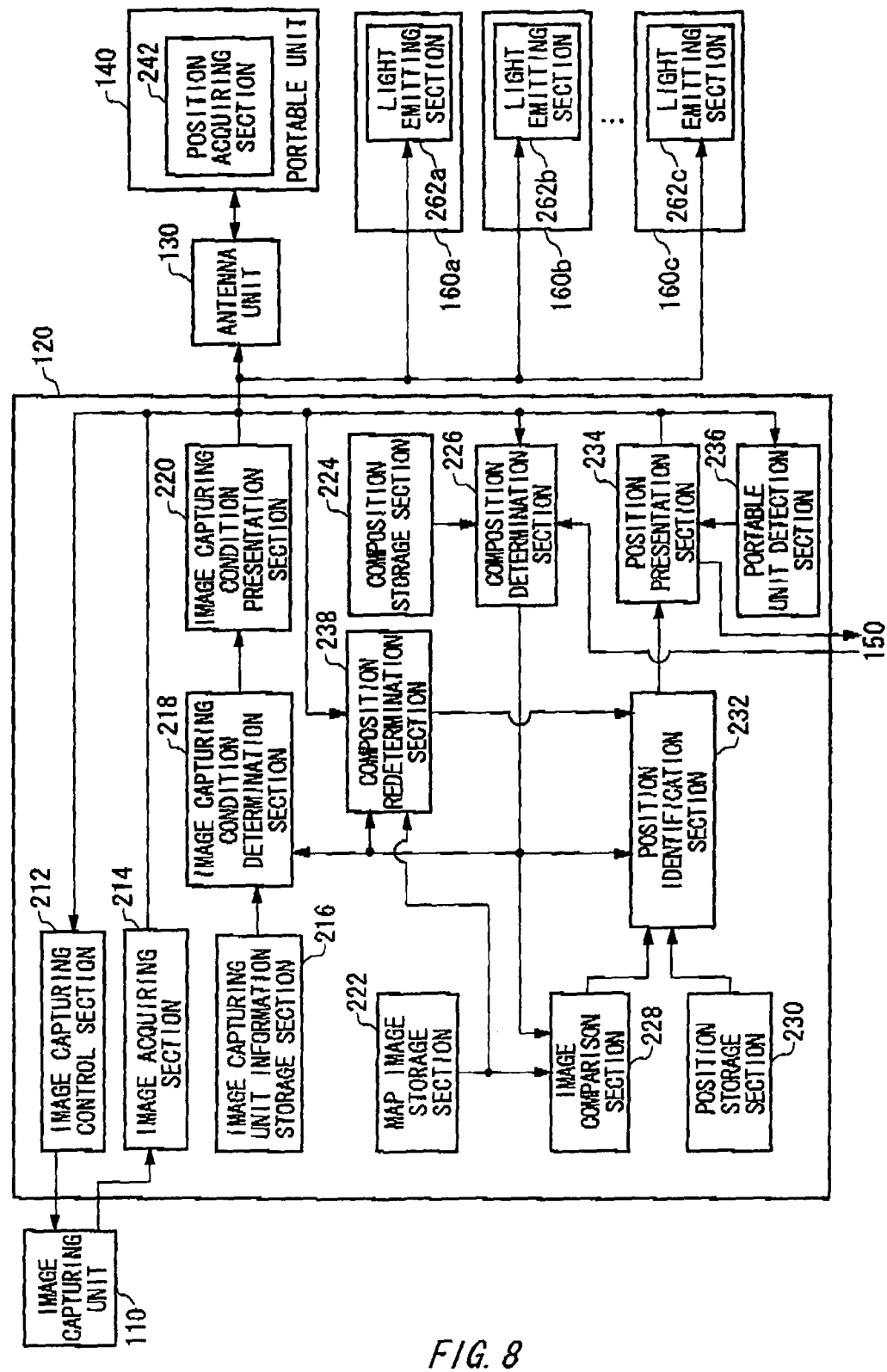
FIG. 8 shows an example of a block configuration of the image capturing system according to another embodiment of the present invention.

FIG. 8 shows an example of a block configuration of the image capturing system according to the present embodiment. The image capturing system includes an image capturing unit 110, a server 120, an antenna unit 130, a portable unit 140 and a plurality of mark units (160a-c, hereinafter generally referred to as 160). The server 120 includes an image capturing control section 212, an image capturing section 214, an image capturing unit information storage section 216, an image capturing condition determination section 218, an image capturing condition presentation section 220, a map image storage section 222, a composition storage section 224, a composition determination section 226, an image comparison section 228, a position storage section 230, a position identification section 232, a position presentation section 234 and a portable unit detection section 236. Each of the mark units 160 has light emitting sections (262a-c, hereinafter generally referred to as 262).

The portable unit 140 is held by a main subject captured by the image capturing unit 110. Then the portable unit 140 transmits a signal to remotely control the image capturing unit 100 by radio communication. For example, the portable unit 140 transmits to the image capturing unit 110 the signal to instruct on image-capturing.

The antenna unit 130 receives the signal from the portable unit 140 by a radio signal. The image capturing control section 212 controls the image capturing unit 110 based on the signal received by the antenna unit 130. For example, the image capturing control section 212 causes the image capturing unit 110 to capture the image when the image capturing control section 212 receives the signal to instruct on the image-capturing from the portable unit 140.

The image capturing unit 110 receives light from the subject by an image capturing device such as a CCD to capture the image of the subject. Then, the captured image acquiring section 214 acquires the image captured by the image capturing unit 110 and stores the same. Here, the image capturing unit 110 may be fixedly installed at a predetermined position. Additionally, the image capturing function of the image capturing unit 110 may be embodied in a terminal held by the user, such as the portable unit 140.

Additionally, the image capturing unit 110 may continuously capture the images of the subject at a predetermined time interval. Then the image capturing unit 110 may store the predetermined number of images which are continuously captured. Then the image acquiring section 214 may acquire the image captured at the timing proximate to the instructed time for capturing by the image capturing unit 110 among the captured images stored in the image capturing unit 110.

The server 120 may transmit the captured image acquired the image acquiring section 214 to the portable unit 140. Then, the portable unit 140 may display the captured image received from the server 120 on a display device to present the same to the user.

The composition storage section 224 stores a plurality of compositions identifying a background image and the position of the subject in the background image. The composition determination section 226 determines the composition of the image to be captured by the image capturing unit 110. For example, the composition determination section 226 selects the composition selected by the user among the plurality of compositions stored in the composition storage section 224.

Specifically, the server 120 transmits the composition stored in the composition storage section 224 to the portable unit 140. The, the portable unit 140 presents the composition received from the server 120 to the user to causes the user to select the same. Then, the portable unit 140 transmits the composition selected by the user to the server 120. At this time, the composition determination section 226 receives the composition selected by the user from the portable unit 140 and selects the received composition among the compositions stored in the composition storage section 224. Here, the composition determination section 226 may be fixedly installed near the position at which the image is captured by the image capturing unit 110. Then, the composition determination section 226 may present the composition captured by the image capturing unit 110 to the user and cause the user to select among the same.

The position identification section 232 identifies at least one of the position of the image capturing unit 110 and the position of the main subject based on the composition determined by the composition determination section 226. Then, the position presentation section 234 presents at least one of the position of the image capturing unit 110 and the position of the main subject identified by the position identification section 232.

The position storage section 230 stores the positions of the main subject in association with the plurality of compositions stored in the composition storage section 224. Then, the position identification section 232 may select the position of the main subject stored in the position storage section in association with the composition determined by the composition determination section 226.

The mark units 160 are provided on the positions of the main subject stored in the position storage section 230. The light emitting sections 262 emit light to notify the user of the positions of the mark units 160. Then, the position presentation section 234 may present information to identify the mark unit 160 provided on the main subject selected by the position identification section 232. Additionally, the position presentation section 234 may light the light emitting section 262 included in the mark unit 160 provided on the position of the main subject selected by the position identification section 232.

The portable unit detection section 236 can receive within a predetermined region including the mark units 160. The portable unit detection section 236 receives a radio signal outputted from the portable unit 140 to detect that the portable unit 140 is located in a predetermined region. Then, the position presentation section 234 presents information to identify the mark unit 160 provided on the position of the main subject selected by the position identification section 232 when the portable unit detection section 236 detects that the portable unit 140 is located in the predetermined region.

The map image storage section 222 stores a three-dimensional map image. Then, the composition determination section 226 determines the composition including the background image of the main subject. The position identification section 232 compares the background image of the main subject including the composition determined by the composition determination section 226 with the three-dimensional map image stored in the map image storage section 222 to identify the position of the image capturing unit 110.

The image capturing unit information storage section 216 stores information indicative of the type of the image capturing unit 110. The image capturing condition determination section 218 determines the image capturing condition of the image capturing unit 110 based on the composition determined by the composition determination section 226 and the information indicative of the type of the image capturing unit 110 which is stored in the image capturing unit information storage section 216. The image capturing condition presentation section 220 presents the image capturing condition of the image capturing unit 110 determined by the image capturing condition determination section 218.

According to the image capturing system of the present embodiment, the user can correctly know the position at which the image capturing unit 110 can capture the image having the composition selected of the user's own choice, or the position at which the user should be located. Additionally, a desirable image capturing condition depending on the type of the image capturing unit 110 to capture the image having the composition selected by the user can be presented to the user.

Here, when the user can not capture the image having the composition selected of the user's own choice at the position presented by the position presentation section 234, the position presentation section 234 may present to the user a position at which the user can capture the image having a composition similar to the composition selected by the user. In this case, the position acquiring section 242 acquires one of the position to which the image capturing unit is fixed and the position to which the main subject is fixed near the position presented by the position presentation section 234. Then, a composition redetermination section 238 determines again a composition of the image to be captured by the image capturing unit 110 based on the composition determined by the composition determination section 226, the three-dimensional map image stored in the map image storage section 222 and the position acquired by the position acquiring section 242. Then, the position identification section 232 identifies the other of the position of the image capturing unit 110 and the position of the main subject based on the composition determined by the composition redetermination section 238.

Specifically, the position acquiring section 234 acquires the position to which the image capturing unit 110 is fixed near the position presented by the position presentation section 234. In this case, the composition redetermination section 238 determines a composition which allows the image capturing unit 110 to capture the main subject and the other subjects in the positional relationship approximately same as the positional relationship between the main subject and the other subjects in the composition determined by the composition determination section 226 based on the composition determined by the composition determination section 226, the three-dimensional map image stored in the map image storage section 222 and the position of the image capturing unit 110 acquired by the position acquiring section 242. Then, the position identification section 232 identifies the position of the main subject based on the composition determined by the composition redetermination section 238.

The position acquiring section 242 acquires the position to which the main subject is fixed near the position presented by the position presentation section 234. In this case, the composition redetermination section 238 determines a composition which allows the image capturing unit 110 to capture the main subject and the other subjects in the positional relationship approximately same as the positional relationship between the main subject and the other subjects in the composition determined by the composition determination section 226 based on the composition determined by the composition determination section 226, the three-dimensional map image stored in the map image storage section 222 and the position of the main subject acquired by the position acquiring section 242. Then, the position identification section 232 identifies the position of the image capturing unit 110 based on the composition determined by the composition redetermination section 238.

Therefore, the image capturing system according to the present embodiment can present to the subject a position near the position firstly presented by the position presentation section 234, where a subject person should stand in order to capture the image having the composition similar to the composition selected by the subject person. For example, the image capturing system according to the present embodiment can present to the subject person the desirable position on which the subject person should stand even if the subject can not captured at the position firstly presented because there is any obstacle at the position firstly presented or the tourist different from the subject person is shown on the image on capturing from the firstly presented position.

Figure 9:
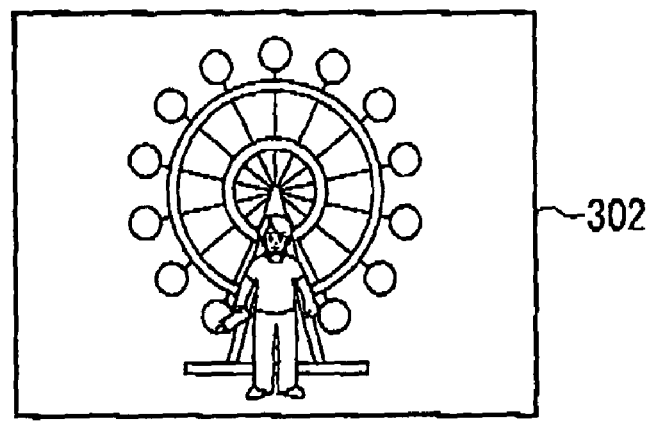
FIG. 9 shows an example of the composition stored in a composition storage section 224 according to another embodiment of the present invention.
Figure 9:
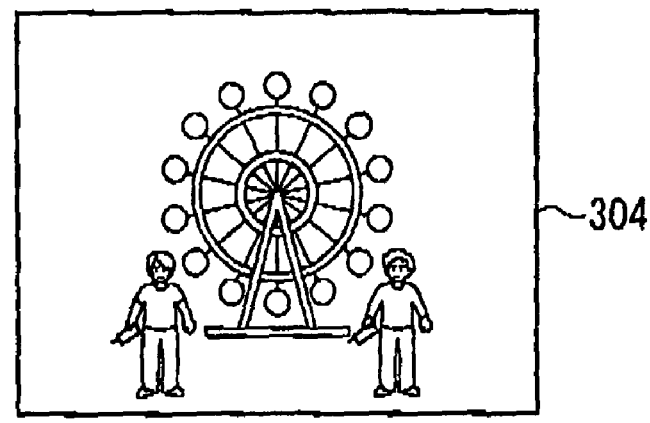
Figure 9:
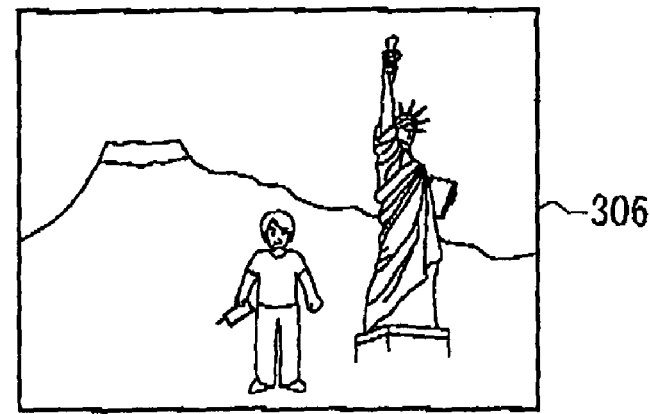

FIG. 9 shows an example of the composition stored in a composition storage section 224 according to the present embodiment. The composition storage section 224 stores a composition image 302 as a composition for capturing the main subject against a background of Ferris wheel, for example. The composition storage section 224 may store a plurality of compositions in which the position and size of the main subject in the image captured by the image capturing unit 110 are different from each other. For example, the composition storage section 224 stores a composition image 304 as a composition for capturing two users against the background of the Ferris wheel same as the composition image 302. Additionally, the composition storage section 224 stores a composition image 306 for capturing the main subject against a background of such as a bronze statue.

The position storage section 230 stores the positions of the main subject in association with each composition stored in the composition storage section 224. Then, the position identification section 232 identifies the position of the main subject based on the position or size of the main subject in the composition determined by the composition determination section 226. For example, the position identification section 232 may select the position of the main subject stored in the position storage section 230 in association with the composition determined by the composition determination section 226. Then, the position presentation section 234 presents the position of the main subject selected by the position identification section 232.

Here, the composition storage section 224 may store a plurality of compositions depending on the number of the main subjects. Then, the position storage section 230 stores the positions of the main subject in association with the plurality of compositions depending on the number of the main subjects stored in the composition storage section 224. Then, the position identification section 232 may identify the positions of the plurality of main subjects to capture the image having the composition determined by the composition determination section 226.

The image capturing presentation section 220 may transmit the image capturing condition to capture the image having the composition selected by the user to the portable unit 140. Specifically, the image capturing condition determination section 218 stores the image capturing condition, such as a zoom value, to capture the image having the composition stored in the composition storage section 224. Then, the image capturing unit information storage section 216 stores control values for controlling the image capturing condition for each image capturing unit 110 for each type of the image capturing unit 110, such as the model of the camera on the market. For example, the image capturing unit information storage section 216 stores the zoom control value for the image capturing section 110 in association with the zoom value for each type of the image capturing unit 110. Then, the image capturing condition determination section 218 determines the image capturing condition for each image capturing unit 110 to capture the image having the composition selected by the composition determination section 226 and presents the same from the image capturing condition presentation section 220 to the portable unit 140 held by the user.

The user adjusts the image capturing condition of the image capturing unit 110 based on the image capturing condition presented by the portable unit 140 and captures the image. When the portable unit 140 has the image capturing unit 110, the portable unit 140 may adjust the image capturing condition of the own capturing unit 110 based on the image capturing condition received from the image capturing condition presentation section 220. Therefore, the user can easily capture the image having the composition of the user's own choice under the appropriate condition according to the image capturing unit 110 held by the user.

Figure 10:
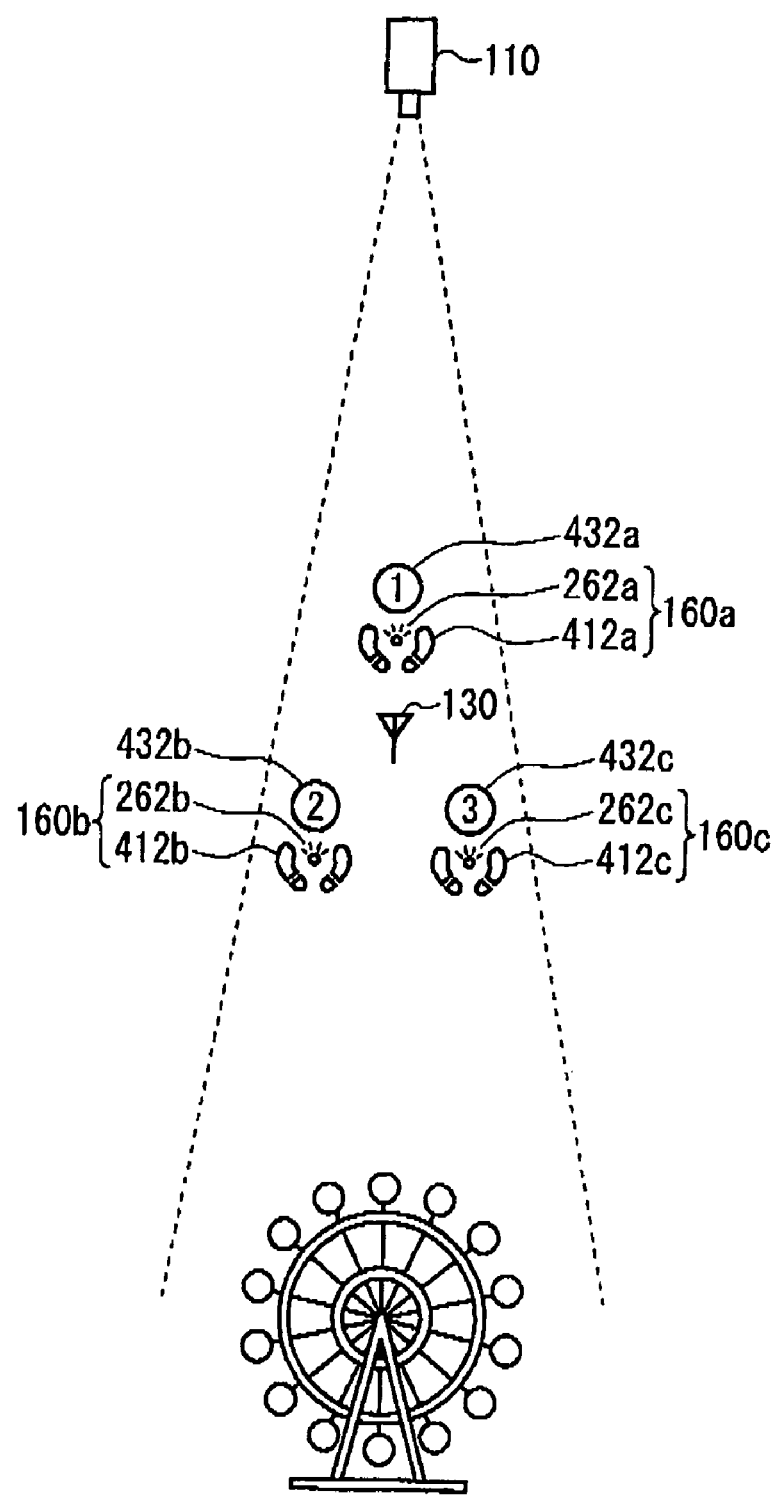
FIG. 10 shows an example of the position at which a main subject should be located according to another embodiment of the present invention.

FIG. 10 shows an example of the position at which a main subject should be located according to the present embodiment. The mark unit 160a is provided on the position at which the user should be located in order to capture an image shown as the composition image 302 by the image capturing unit 110. The mark units (160b and 160c) are provided on the position at which the user should be located in order to capture an image shown as the composition image 304.

Each of the mark units 160 has the position marks (412a-c, hereinafter generally referred to as 412) indicative of the positions at which the main subject should be located. The light emitting sections 262 are provided near the position marks 412. Additionally, the mark identification indicators (432a-c, hereinafter generally referred to as 432) for identifying each of the mark units (160a-c) are drawn near each of the mark units 160.

Here, the mark units 160 may be provided on the positions depending to the number of main subjects, respectively. Specifically, the position mark 412a is drawn on the position at which one main subject should be located in order to capture the image having the best composition when the main subject is captured by the image capturing unit 110. Additionally, the position mark 412b and the position mark 412c are drawn on the position at which two main subjects should be located in order to capture the image having the best composition of the two main subjects.

Here, the position presentation section 234 may transmit the image indicative of the mark identification indicator 432 for identifying the mark unit 160 provided on the position of the main subject selected by the position identification section 232 to the portable unit 140. Then, the portable unit 140 may display the received mark identification indicator 432 on the portable unit 140 to notify the user of the position at which the main subject should be located. Additionally, the position presentation section 234 causes the light emitting section 262 provided at the position of the main subject identified by the position identification section 232 to light to notify the user of the position at which the main subject should be located.

The mark units 160 may be luminescence material applied on the position at which the main subject should be located. Then, the position presentation section 234 may present the position at which the main subject is located by lighting the luminescence material with an ultraviolet flash.

Additionally, the mark units 160 may indicate the position to which the main subject should be located and the direction of the image capturing unit 110. For example, the position marks 412 may some marks in the shape of foot of humans which are drawn on the ground at which the user should be located. In this case, the face of the person who stands on the marks faces toward the direction of the image capturing unit 110. Additionally, the mark units 160 may include marks drawn on which the user should be located and directional arrows indicative of the direction to which the image capturing unit 110 is installed in addition to the marks in shape of foot of humans.

Here, the position marks 412 may be provided on the position at which the position marks 412 are not shown on the image captured by the image capturing unit 110 when the main subject is located thereon. For example, the main subject exists on the position at which the position marks 412 are provided, so that the position marks 412 are hidden by the main subject, thereby the position marks 412 are not shown on the captured image. Specifically, any user stands on the position at which the position marks 412 are provided, so that the position marks 412 are hidden by the feet of the user, thereby the position marks 412 are not shown on the captured image. For example, the position marks 412 may be marks having the size smaller than that of a foot of humans.

Additionally, image capturing buttons may be provided near for each of the mark units 160, respectively. For example, the image capturing buttons for instructing the image capturing unit 110 on image-instructing may be provided under user's feet positioned on each of the position marks 412. Then, the image capturing unit 110 may identify the mark unit 160 corresponding to the image capturing button operated by the user's foot to capture the image in the composition depending on the number of main subjects indicated by the mark unit 160. Additionally, the image capturing unit 110 may capture an image provided that the number of the users corresponding to the number of the main subjects indicated by each of the mark units 160 are located on the mark units 160. For example, the image capturing buttons may be provided at each of the positions on which the main subjects should be located, indicated by the position marks 412 respectively. Then, the image capturing unit 110 may capture an image provided that all of the image capturing buttons provided at the positions at which the main subjects indicated by the mark units 160 should be located are operated by the number of users corresponding to the number of the main subjects indicated by the mark units 160.

The antenna units 130 can receive within a predetermined region including the mark units 160. The antenna units 130 receive a radio signal outputted from the portable unit 140 and transmits the same to the portable unit detection section 236. When the antenna units 130 receives the radio signal from the portable unit 140, the portable unit detection section 236 detects that the portable unit 140 is located in the predetermined region including the mark units 160. At this time, the position identification section 232 identifies the position at which the main subject should be located to capture the image having the composition to be captured at the positions of the mark units 160. Then, the position presentation section 234 causes the light emitting section 262 included in the mark unit 160 provided on the position identified by the position identification section 232 to light. The position presentation section 234 may display the mark identification indicators 432 for identifying the mark units 160 on the portable unit 140 to notify the user of the location at which the user should be located. Therefore, the user can easily recognize to be located near the region for capturing by the image capturing unit 110. Additionally, the user can correctly know the location at which the user should be positioned in order to capture the user's image having a desirable composition.

The region in which the antenna unit 130 can receive the radio signal from the portable unit 140 may include an image capturing region in which images are captured by the image capturing unit 110, which includes the mark units 160. Additionally, the region in which the antenna unit 130 can receive the radio signal from the portable unit 140 may be a region in which the antenna units 130 can receive the radio signal from the portable unit 140 held by the user located near the mark units 160. Therefore, the server 120 can appropriately present the composition captured by the image capturing unit 110 and the position at which the user captured by the image capturing unit 110 should be located.

The antenna units 130 may be installed near the positions of the mark units 160. Additionally, the antenna units 130 may be embedded in the ground so as not to be shown on the image captured by the image capturing unit 110. The antenna units 130 may be provided outside of the region captured by the image capturing unit 110. Further, the antenna units 130 may be provided on the location higher than the ground, such as the wall of a building.

Figure 11:
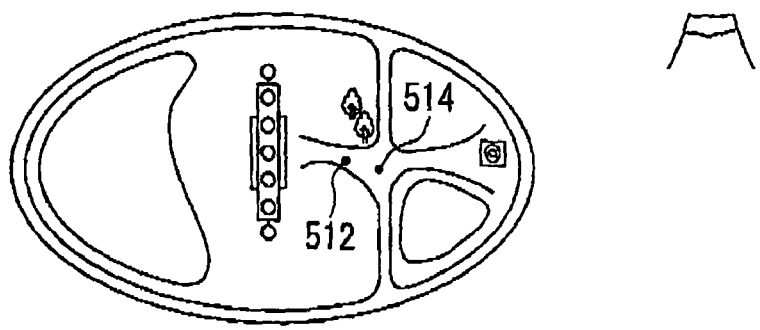
FIG. 11 shows an example of information indicative of the positions of the image capturing unit 110 and the main subject presented by a position presentation section 234 according to another embodiment of the present invention.
Figure 11:
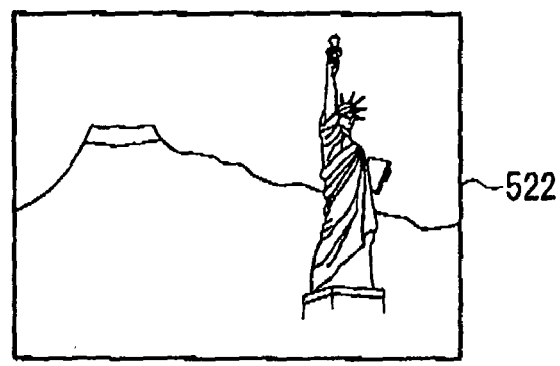
Figure 11:
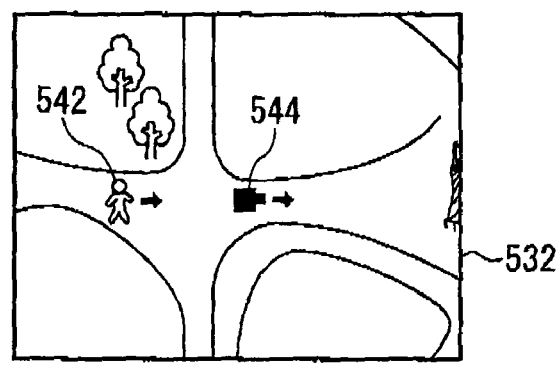
Figure 11:
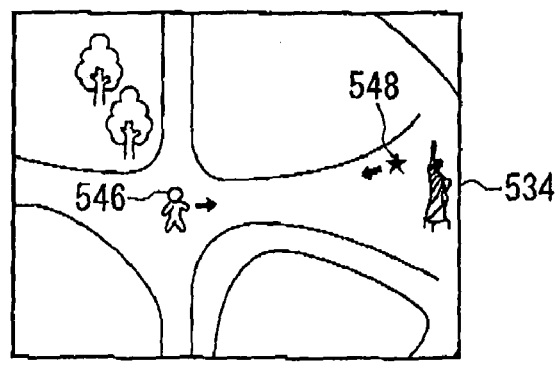

FIG. 11 shows an example of information indicative of the position of the image capturing unit 110 and the main subject presented by the position presentation section 234 according to the present embodiment. The portable unit 140 held by the user being a photographer receives the position of the image capturing unit 110 to capture a composition image 522 from the position presentation section 234 at a position 512 in the amusement park. The portable unit 140 held by the user being a subject person receives the position of the main subject to capture the composition image 522 from the position presentation section 234 at a position 514 in the amusement park Then, the portable unit 140 displays a map image 532 and a map image 534 thereon based on the information received from the position presentation section 234 to notify the user of the position of the image capturing unit 110 and the position of the main subject.

For example, the portable unit 140 receives the latitude and longitude of the position at which the image capturing unit 110 should be located from the position presentation section 234 to display thereon the map image 532 including the position. Then, the portable unit 140 displays an image capturing position indicator 544 indicative of the position of the image capturing unit 110 on the map image 532. The portable unit 140 may identify the current position of the portable unit 140 using GPS information received from Global Positioning System satellite to further display a current position indicator 542 indicative of the current position of the portable unit 140 on the map image 532. Additionally, the portable unit 140 may display a directional arrow indicative of the direction of the image capturing unit 110 from the current position of the portable unit 140.

In the same way, the portable unit 140 receives the latitude and longitude of the position at which the main subject is located from the position presentation section 234 to display thereon the map image 534 including the position. Then, the portable unit 140 displays an image capturing position 548 indicative of the position of the main subject on the map image 534. The portable unit 140 may identify the current position of the portable unit 140 using GPS information received from Global Positioning System satellite to display a current position indicator 546 indicative of the current position of the portable unit 140 on the map image 534. Additionally, the portable unit 140 may display a directional arrow indicative of the direction of the position at which the main subject should be located from the current position of THE portable unit 140.

Additionally, the portable unit 140 receives the position of the image capturing unit 110 and the position at which the main subject should be located from the position presentation section 234 to display the directional arrow indicative of the direction to which the main subject should be located from the image capturing unit 110 on the map image 532. In the same way, the portable unit 140 receives the position at which the position of the image capturing unit 110 and the position at which the main subject should be located from the position presentation section 234 to display the directional arrow indicative of the direction from the position at which the main subject should be located to the position of the image capturing unit 110 on the map image 534.

The position storage section 230 may store the image capturing direction of the image capturing unit 110 at the image capturing position thereof, and the direction to which the main subject should face at the image-captured position thereof. Then, the position identification section 232 identifies the direction of the image capturing direction of the image capturing unit 110 and the direction to which the main subject should face based on the composition determined by the composition determination section 226. Then, the position presentation section 234 may transmit each of the identified directions to the portable unit 140. The portable unit 140 may display the directional arrow indicative of the image capturing direction of the image capturing unit 110 and the directional arrow indicative of the direction to which the main subject should face on the map image 532 and the map image 534, respectively.

Here, the image comparison section 228 compares the composition determined by the composition determination section 226 with the comparison image generated based on the three-dimensional map image stored in the map image storage section 222, so that the position identification section 232 may identify the position of the image capturing unit 110.

For example, the image comparison section 228 selects the position within the region included in the three-dimensional map image stored in the map image storage section 222 as the image capturing position. Then, the image comparison section 228 may select the capturing direction captured from the selected image capturing position per one degree. Further, the image comparison section 228 may select the angle of view captured in the selected image capturing direction per one degree. Then, the image comparison section 228 calculates the pixel value for each image acquired when images are captured from the plurality of image capturing positions under the condition of a plurality of image capturing directions and a plurality of angles of view at a plurality of image capturing positions by using the three-dimensional map image information to generate a plurality of comparison images. Then, the image comparison section 228 calculates the difference between the plurality of comparison images and the composition image including the background determined by the composition determination section 226. Then, the position identification section 232 identifies, among the plurality of comparison images, the image capturing position and direction at which the comparison image having the smallest difference from the composition image is generated. Then, the position presentation section 234 transmits the image capturing position and direction which are identified by the position identification section 232 to the portable unit 140.

Since the image comparison section 228 compares the composition image with the comparison image to identify the position of the image capturing unit 110, it is not necessary that the position of the image capturing unit 110 is registered in the image capturing system again when a new composition provided by the image capturing system is added, but only an image having the new composition is added to the composition storage section 224. Therefore, any new composition can more easily be added.

Additionally, the image comparison section 228 may determine the image region having the frequency component less than a predetermined frequency with the intensity more than a predetermined intensity in the composition image including the background determined by the composition determination section 226 as an image region on which sky is shown up, so that the image comparison section 228 may compare the composition image 522 with the comparison image except for the region on which sky is shown up. Thereby the image comparison section 228 can appropriately compare the composition image 522 with the comparison image even if sky is shown up on the composition image 522.

Figure 12:
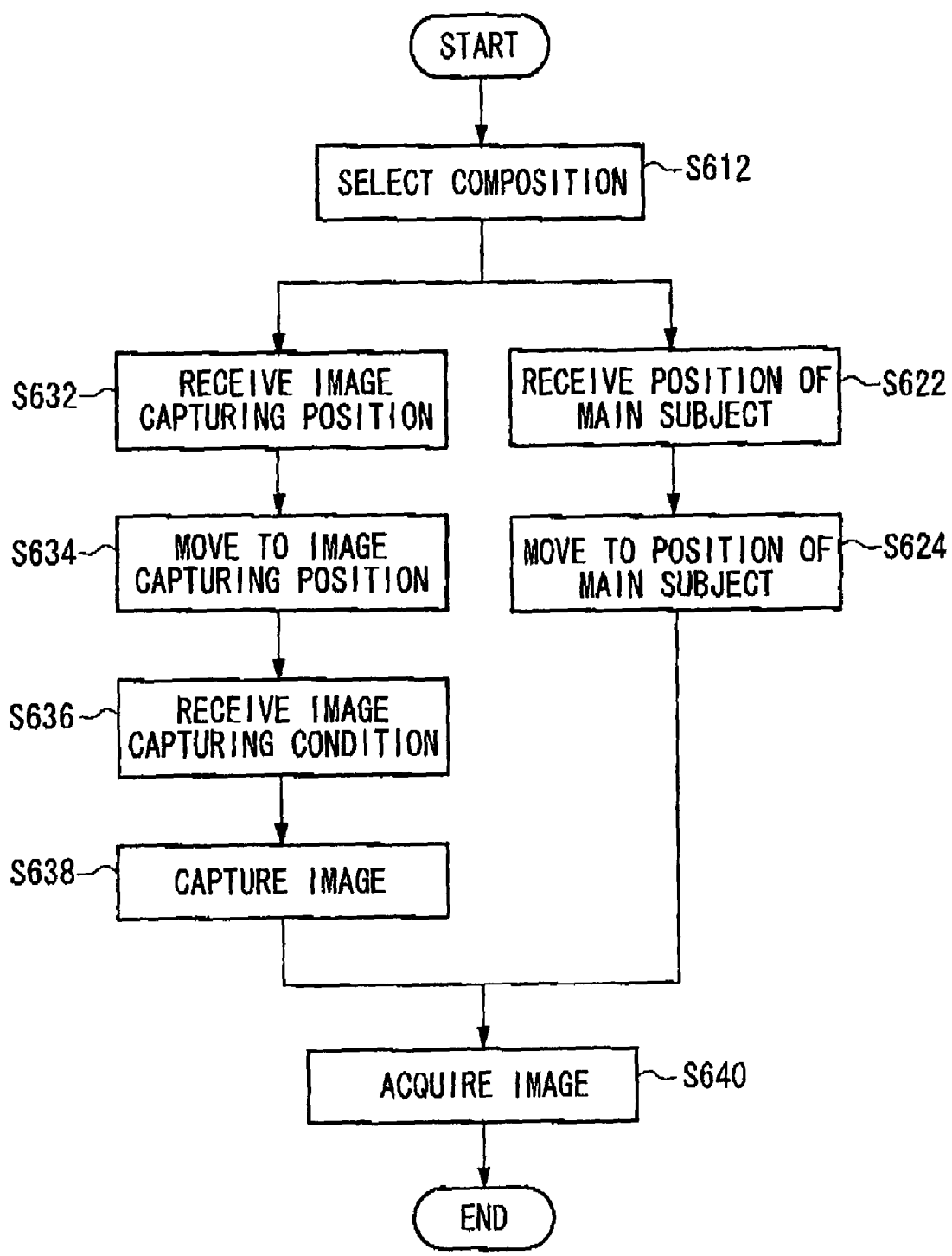
FIG. 12 shows an example of the procedure of the image-capturing using the image capturing unit 110 according to another embodiment of the present invention.

FIG. 12 shows an example of the procedure of the image-capturing using the image capturing unit 110 according to the present embodiment. The user selects a composition to be captured (S612). The user who selects the composition to be captured may be a subject person who is captured by the image capturing unit 110 or a photographer who captures the image of the subject person using the image capturing unit 110.

Next, the photographer receives the position of the image capturing unit 110 using the portable unit 140 (S632), and moves to the position of the image capturing unit 110 displayed on the portable unit 140 (S634). Meanwhile, the subject person receives the own position by the portable unit 140 (S622), and moves to the position displayed on the portable unit 140 where the subject person should be located (S624) Next, the photographer captures an image using the image capturing unit 110 under the image capturing condition presented by the image capturing condition presentation section 220 (S638). Then, the user acquires the captured image using the portable unit 140.

Here, the position presentation section 234 may previously store the portable unit 140 held by the photographer and the portable unit 140 held by the subject person in association with each other. Then, the position presentation section 234 may transmit the position of the image capturing unit 110 and the position of the subject person in order to capture the image having the composition selected by the portable unit 140 held by any of the photographer or subject person to the portable unit 140 held by the photographer and the portable unit 140 held by the subject person in association with each other.

The image capturing system according to the present embodiment can notify the user of the position of the image capturing unit 110 and the position at which the user should be located to capture the image having the appropriate composition. Therefore, the user can easily capture the image having the desirable composition.

Figure 13:
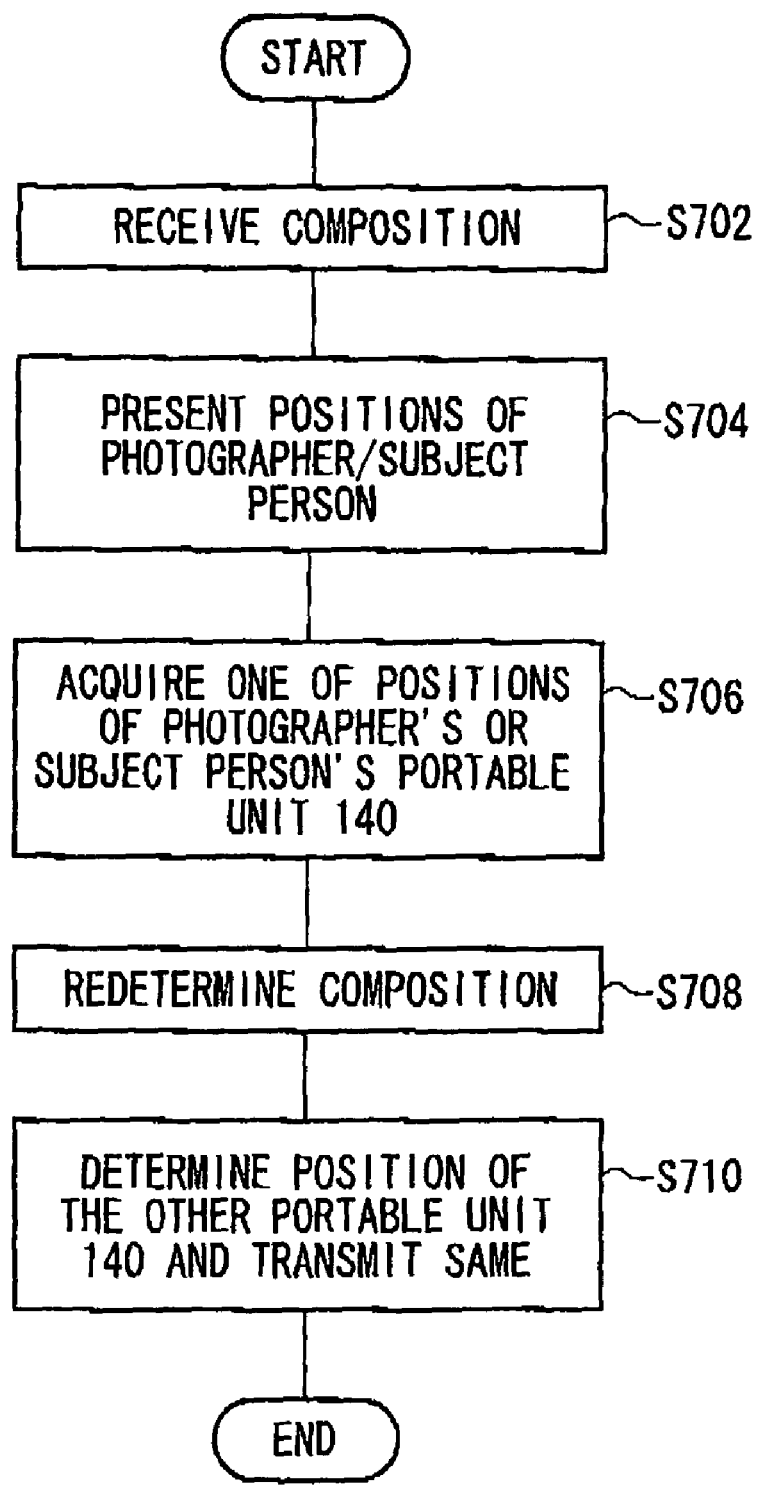
FIG. 13 shows an example of the operation flow of a sever 120 according to another embodiment of the present invention.

FIG. 13 shows an example of the operation flow of a sever 120 according to the present embodiment, to present the user's position at which the image having the composition similar to the selected composition can be captured. The portable unit 140 held by the photographer or subject person (main subject) transmits the composition selected by the photographer or subject person to the server 120. The composition determination section 226 receives the composition transmitted from the portable unit 140 (S702). Then, the position presentation section 234 presents the position of the photographer and the position of the subject person where the composition received in the S702 can be captured. At this time, the position presentation section 234 may present a predetermined range including the position of the photographer and the position of the subject person. For example, the position presentation section 234 may transmit the map information indicative of the predetermined range including the positions to the portable unit 140.

Then, the portable unit 140 held by the photographer and the portable unit 140 held by the subject person present the position of the photographer and the position of the subject person which are received from the position presentation section 234. Then, the photographer and the subject person move to near the presented positions, respectively. Then the photographer fixes the position near the presented position.

At this time, the position acquiring section 242 of the portable unit 140 held by the photographer acquires the fixed position of the photographer and transmits the same to the server 120.

Then, the composition redetermination section 238 acquires the position of the portable unit 140 held by the photographer from the position acquiring section 242 (S706). Then, the composition redetermination section 238 determines a composition in which the subject person can be captured in the positional relationship proximate to the positional relationship between the subject person indicated in the composition acquired in the S702 and the other subject persons (S708). Then, the position presentation section 234 calculates the position of the subject person where the image having the composition determined in the S708 can be captured and transmits the same to the portable unit 140 held by the subject person (S710). Then, the portable unit 140 held by the subject person receives the position transmitted from the position presentation section 234 in the S710 and displays the same on the monitor screen thereon.

The server 120 previously distinguishes and registers the portable unit 140 held by the subject person and the portable unit 140 held by the photographer. Then, the server 120 may determine the position acquired from the portable unit 140 registered as the photographer's portable unit 140 as the position of the photographer. Here, the composition redetermination section 238 may determine the position acquired in the S706 as the position of the photographer when the position acquired in the S706 is nearer the position of the photographer presented in the S704 than the position of the subject person presented by the position presentation section 234 in the S704. Additionally, the composition redetermination section 238 may determine which the position acquired in the S706 is the photographer's or the subject person's based on the signal intensity of the antenna units 130 which received the signal indicative of the position. For example, when the intensity of the signal received by the antenna unit 130 near the presented image-capturing position is larger than the intensity of the same signal received by the antenna unit 130 near the presented image-captured position, the composition redetermination section 238 may determine that the received signal is the signal indicative of the position from the portable unit 140 held by the photographer.

Here, the case that the server 120 determines the position of the subject person while the position of the photographer is fixed has been described in the present embodiment. Meanwhile, in the case that the server 120 determines the position of the photographer when the position of the subject person is fixed, the composition redetermination section 238 acquires the position of the portable unit 140 from the position acquiring section 242 in the S706. In S708, the composition redetermination section 238 redetermines the composition in which the photographer can capture the image in the positional relationship proximate to the relationship between the subject person and the photographer indicated by the composition acquired in the S702 when the subject is located at the position thereof acquired in the S706. Then, in S710, the position presentation section 234 calculates the position at which the image having the composition which has been determined in the S708 and transmits the same to the portable unit 140 held by the photographer.

As described above, the position presentation section 234 determines any one of the positions of the photographer or the subject person near the position firstly presented by the position presentation section 234 and presents again the position at which the image having the composition similar to the previously selected composition. Therefore, the image capturing system according to the present embodiment can present the position at which the image having the composition similar to the previously selected composition can be captured to the photographer or subject person when there is any obstacle at the position presented by the position presentation section 234 and the photographer can not capture at the firstly presented position but capture at the different position from the firstly presented position.

Figure 14:
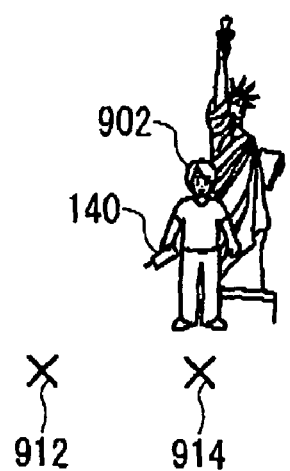
FIG. 14 shows an example of the presentation of the position of a photographer according to another embodiment of the present invention.
Figure 14:
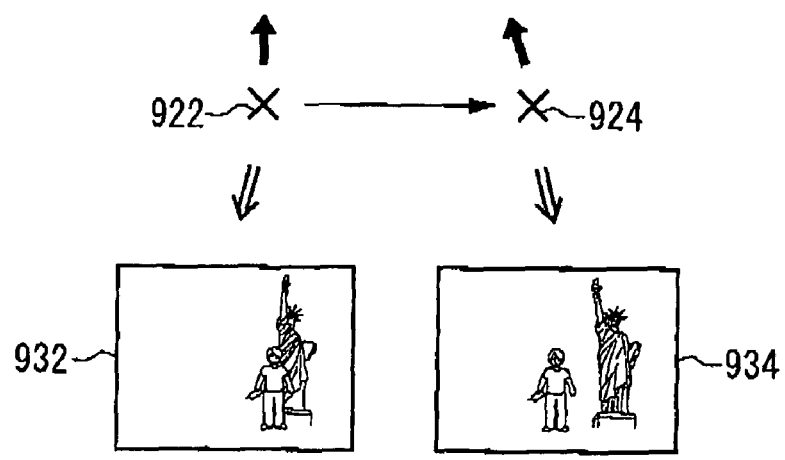

FIG. 14 shows an example of the presentation of the position of the photographer depending on the position of the subject person according to the present embodiment. In FIG. 14, the position presentation section 234 presents a subject persons' position 912 to capture the image having a composition 306 selected by the subject person. Here, a subject person 902 determines a position 914 which is near the subject persons' position 912 and is different from the subject persons' position 912 as the position of the subject person. In this case, the image in which a monument 900 and the subject person are overlapped is captured when the subject person is photographed from a position 922 of the photographer presented by the position presentation section 234. At this time, the subject person 902 executes an operation on the portable unit 140 that the position of the portable unit 140 is transmitted to the server 120 at the determined position 914, and then, the position acquiring section 242 of the portable unit 140 acquires GPS information from Global Positioning System satellite and transmits the latitude and longitude information of the position 914 indicated by the acquired GPS information to the server 120.

Then, the composition redetermination section 238 of the server 120 set each of the plurality of positions included in a predetermined range including the image capturing position 922 as the image capturing positions and determines the positional relationship between the object included in the three-dimensional map image stored in the map image storage section 222 and the subject persons' position 914 in each of the composition images acquired by capturing images with various directions and angle of views from each of the image capturing positions. Specifically, the composition redetermination section 238 calculates the distance between the subject person's position 914 and the object included in the three-dimensional map image as an index indicative of the positional relationship between the subject person and the object. Additionally, the composition redetermination section 238 may further calculate the coordinate of the intermediate position between the subject person and the object included in the three-dimensional map image as the index indicative of the positional relationship between the subject person and the object. Then, the composition redetermination section 238 compares the coincidence between the positional relation ship of which index is the calculated distance or the coordinate of the intermediate position and the positional relationship in the composition 306 among the composition images to select the composition image having the maximum coincidence of the positional relationship.

The position identification section 232 selects the image capturing position, the image capturing direction and the angle of view for the composition image selected by the composition redetermination section 238. Then, the position presentation section 234 transmits the image capturing position, the image capturing direction and the angle of view selected by the position identification section 232 to the portable unit 140. The portable unit 140 held by the photographer displays the image capturing position received from the position presentation section 234 on the monitor screen thereon and announce the photographer by voice to notify the photographer of the image capturing position 924. For example, on receiving the image capturing position 924, the portable unit 140 held by the photographer may acquire the own current position from GPS information and notify the photographer of the direction and the distance from the acquired position of the portable unit 140 to the image capturing position 924. Specifically, the portable unit 140 held by the photographer may display the directional arrow indicative of the direction from the current position to the image capturing position 924 and the distance to the image capturing position 924, and reproduce a guiding voice such as "Move to the right direction by 10 m". Additionally, the portable unit 140 held by the photographer may display the image capturing condition, such as an image capturing direction and an angle of view which are received from the position presentation section 234 on the monitor screen to present the same to the photographer.

Here, the case that the distance between the subject person and the object, and the coordinate of the middle point between the subject person and the object are as the index indicative of the positional relationship between the subject person and the object has been described. Additionally, the position of the subject person or the position of the object in the composition image may be as the other index indicative of the positional relationship. For example, the composition redetermination section 238 may preferentially determine the composition in which the coincidence between the position of the subject person or the position of the object in any composition image, and the position of the subject person or the position of the object in the composition image 306 is higher. According to the image capturing system of the present embodiment as described above, the photographer can easily know the position at which the image can be captured with the desirable positional relationship between the subject person and the monument when the subject person is captured at the position relatively far from the previously presented position.

Figure 15:
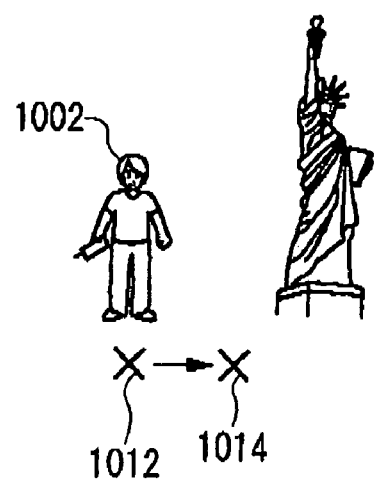
FIG. 15 shows an example of the presentation of the position of a subject person according to another embodiment of the present invention.
Figure 15:
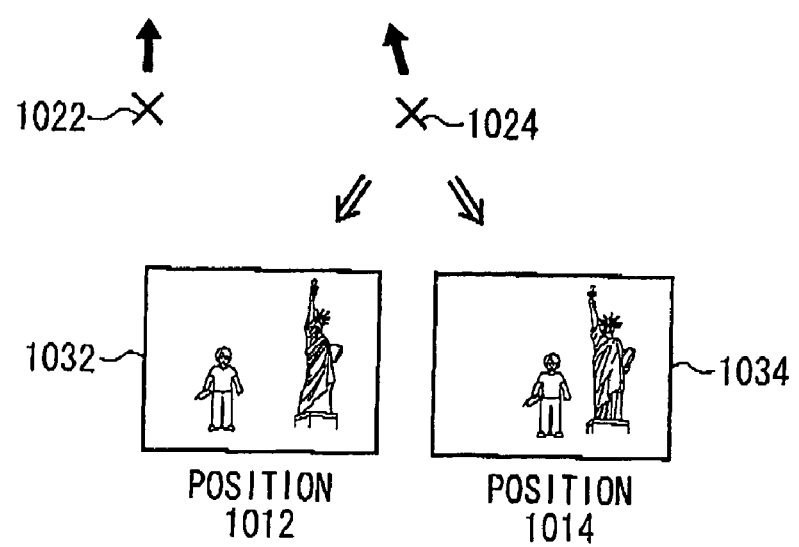

FIG. 15 shows an example of the presentation of the position of the subject person depending on the position of the photographer according to the present embodiment. In FIG. 14, a photographer's position 1022 where the image having the composition 306 selected by the photographer is captured is presented by the position presentation section 234. However, in this case, the photographer sets the image capturing position to a position 1024 not same as the photographers' position 1022 but near the photographers' position 1022. Here, when the photographer captures an image of the subject person located at the position 1012 presented by the position presentation section 234 from the position 1024, an image 1032 in which the subject person is far from the monument is captured. Here, the photographer transmits the position of the portable unit 140 to the server 120 at the set position 1024 through the portable unit 140, and then, the position acquiring section 242 of the portable unit 140 acquires GPS information from Global Positioning System satellite and transmits the acquired latitude and longitude information of the position 1024 indicated by the GPS information to the server 120.

Then, the composition redetermination section 238 of the server 120 determines the positional relationship between the object included in the three-dimensional map image stored in the map image storage section 222 and the subject person in the composition image obtained when the subject person located at various subject person's positions around the subject person's position 1012 is captured in various directions and angle of views from the image capturing position 1024. Specifically, the composition redetermination section 238 calculates the distance between the subject person's position and the object included in the three-dimensional map image as an index indicative of the positional relationship between the subject person and the object. Additionally, the composition redetermination section 238 may further calculate the coordinate of the intermediate position between the subject person's position and the object included in the three-dimensional map image as an index indicative of the above-described positional relationship. Then the composition redetermination section 238 compares the coincidence of the positional relationship based on the index such as the calculated distance and the calculated coordinate of the intermediate position, and the coincidence of the positional relationship in the composition 306 among the composition images and selects the composition image having the maximum coincidence of the positional relationship.

Then, the position identification section 232 selects a subject person's position 1014, the image capturing direction, and the angle of view for the composition image selected by the composition redetermination section 238. Then, the position presentation section 234 transmits the subject person's position 1014 selected by the position identification section 232 to the portable unit 140 held by the photographer. The portable unit 140 held by the subject person displays the subject person's position 1014 received from the position presentation section 234 on the monitor screen thereon and notifies the subject person by voice so that the subject person recognizes the subject person's position 1014. For example, on receiving the subject person's position 1014, the portable unit 140 held by the subject person may acquire the current position of the portable unit 140 from GPS information and notify the subject person of the direction and the distance from the acquired position of the portable unit 140 to the subject person's position 1014. Specifically, the portable unit 140 held by the subject person may display the directional arrow indicative of the direction from the current position to the subject person's position 1014 and the distance to the subject person's position 1014, and reproduce a guiding voice such as "Move to the left direction by 3 m". Here, the portable unit 140 held by the subject person may receive the image capturing condition identified by the position identification section 232, such an image capturing direction and an angle of view from the position presentation section 234 and display the received image capturing condition on the monitor screen thereon to present the same to the photographer.

According to the image capturing system of the present embodiment as described above, the subject person can easily know the position at which the subject person and the monument are captured in the desirable positional relationship when the subject is captured at the position different from the position firstly presented.

Figure 16:
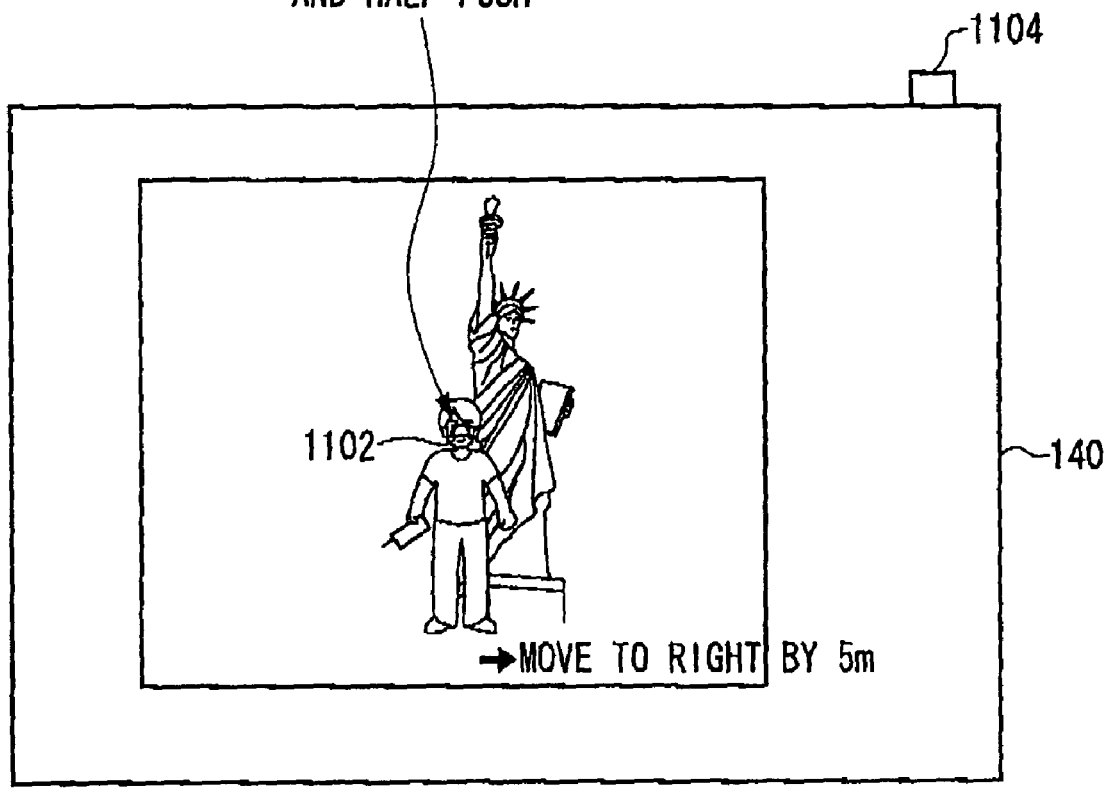
FIG. 16 shows an example of the operation of a portable unit 140 when a position acquiring section 242 acquires the position of the subject person or the photographer.

FIG. 16 shows an example of the operation of the portable unit 140 when the position acquiring section 242 acquires the position of a subject person or photographer according to the present embodiment. The case that the position acquiring section 242 acquires the positions of the subject person and the photographer by receiving GPS information from Global Positioning System satellite has been described with reference to FIG. 9 and FIG. 10. Now, the case that the position acquiring section 242 provided in the server 120 acquires the position of a subject person or photographer by image capturing information of the photographer will be described.

Capturing the image to acquire the position using the portable unit 140, the photographer half pushes a shutter button while a marker 1002 on an image capturing monitor is overlapped with the subject person. At this time, the portable unit 140 focuses on the subject person with which the marker 1002 is overlapped and calculates the distance to the subject person based on the control value at the focusing. Additionally, the portable unit 140 transmits the image captured at the timing at which the shutter button 1104 is half pushed and the distance to the subject person to the server 120, and compares the image captured by the portable unit 140 with the three-dimensional map image information stored in the image storage section 222 to identify the position and the image capturing direction of the photographer. Here, when the position and the image capturing direction of the portable unit 140 is identified by comparing the image captured by the portable unit 140 with the three-dimensional map image information, the operation of the position acquiring section 242 is same as the operation when the position of the photographer is calculated by comparing the composition image with the three-dimensional map image information with reference to FIG. 5, therefore, the description is omitted. Additionally, the position acquiring section 242 identifies the subject person's position based on the identified position and the image capturing direction of the portable unit 140, and the distance to the subject person received from the portable unit 140.

Thus, the position acquiring section 242 can identify the position of the photographer and the subject person from the image capturing information by the portable unit 140 held by the photographer. Therefore, the server 120 can acquire the positional information of the photographer and the subject person at the same time. Thereby the server 120 can identify the position of the photographer and the subject person by operating the portable unit 140 by the photographer without operating the portable unit 140 by the subject person even if the subject person is captured at the position different from the position firstly presented.

Additionally, the position acquiring section 242 may identify the position of the subject person or photographer having the portable unit 140 based on the intensity of the signal from the portable unit 140 received by the three or more antenna sections 130 which are not in alignment. Here, the position acquiring section 242 may determine whether the identified position is the photographer's position or the subject person's position based on the distance between the identified position and the position presented by the position presentation section 234. Further, the position acquiring section 242 may determine whether the identified position is the photographer's position or the subject person's position based on the operation mode set to the portable unit 140 by the subject person or the photographer. For example, the portable unit 140 may transmit the signal indicative of the operation mode to the server 120. Then, the position acquiring section 242 may determine the identified position of the portable unit 140 which transmitted the signal as the position of the photographer when the operation mode indicated by the signal received from the portable unit 140 is an image capturing mode.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An image capturing system comprising:
    a composition storage section for storing a plurality of compositions which identify a background image and a position in the background image of a main subject;
    a composition determination section for determining a composition desirable to a user among the plurality of compositions;
    an image capturing unit for capturing an image of the main subject having the composition determined by the composition determination section;
    a position identification section for identifying at least one of the position of the image capturing unit and the position of the main subject based on the composition determined by the composition determination section;
    a position presentation section for presenting to the user at least one of the position at which the image capturing unit is located and the position at which the main subject is located at a time that the image capturing unit captures the image, which are identified by the position identification section;
    a portable unit detection section for detecting a portable unit that is held by a person, who is a main subject of an image, and is located in a predetermined region within which the image having the determined composition can be captured by the image capturing unit;
    the position identification section identifies the position at which the person holding the detected portable unit is to be located when the image capturing unit captures the image having the determined composition so that the person can select the desirable composition; and
    when the portable unit detection section detects the portable unit within the predetermined region, the position presentation section transmits the identified position to the portable unit and the portable unit presents the received identified position to the person so that the person can take the image having the determined composition.

2. The image capturing system according to claim 1, wherein the composition determination section selects the composition selected by a user among the plurality of compositions stored in the composition storage sections.

3. The image capturing system according to claim 2 further comprising:
    an image capturing unit information storage section for storing information indicative of the type of the image capturing unit;
    an image capturing condition determination section for determining an image capturing condition of the image capturing unit based on the composition determined by the composition determination section and the information indicative of the type of the image capturing unit stored in the image capturing unit information storage section; and
    an image capturing condition presentation section for presenting the image capturing condition of the image capturing unit determined by the image capturing condition determination section.

4. The image capturing system according to claim 2, wherein
    the image capturing unit is fixedly installed in a predetermined position;
    the composition storage section stores a plurality of compositions in which the position or size of the subject in each image captured by the image capturing unit are different, respectively;
    the position identification section identifies the position of the main subject based on the position or size of the main subject in the composition determined by the composition determination section; and
    the position presentation section presents the position of the main subject identified by the position identification section.

5. The image capturing system according to claim 4 further comprising:
    a position storage section for storing the position of the main subject in association with the plurality of compositions stored in the composition storage section; and a mark unit provided at the position of the main subject stored in the position storage section, wherein the position identification section selects the position of the main subject stored in the position storage section in association with the composition determined by the composition determination section, and the position presentation section identifies the mark unit provided at the main subject selected by the position identification section.

6. The image capturing system according to claim 5 further comprising:

a portable unit held by the main subject; and a portable unit detection section for receiving within a predetermined region including the mark unit, a radio signal outputted from the portable unit and detecting that the portable unit is located in the predetermined region, wherein the position presentation section presents information for identifying the mark unit provided at the position of the main subject selected by the position identification section when the portable unit detection section detects that the portable unit is located in the predetermined region.

7. The image capturing system according to claim 6, wherein the mark unit is drawn on the position of the main subject selected by the position identification section along with information for identifying the mark unit, and the position presentation section transmits the information for identifying the mark unit provided at the position of the main subject selected by the position identification section to the portable unit and causes the portable unit to display the same.

8. The image capturing system according to claim 6, wherein the mark unit has a light emitting section for emitting light, and the position presentation section causes the mark unit provided at the position of the main subject selected by the position identification section to light.

9. The image capturing system according to claim 1 further comprising a map image storage section for storing a three-dimensional map image, wherein the composition determination section determines a composition including a background image of the main subject, and the position identification section compares the background image of the main subject included in the composition determined by the composition determination section with the three-dimensional map image stored in the map image storage section to identify the position of the image capturing unit.

10. An image capturing system comprising:

an image capturing unit;

a composition determination section for determining a composition of an image to be captured by the image capturing unit;

a position identification section for identifying at least one of the position of the image capturing unit and the position of a main subject based on the composition determined by the composition determination section;

a position presentation section for presenting at least one of the position of the image capturing unit and the position of the main subject which are identified by the position identification section;

a position acquiring section for acquiring one of the position to which the image capturing unit is fixed and the position to which the main subject is fixed near the position presented by the position presentation section;

a map image storage section for storing a three-dimensional map image; and a composition redetermination section for determining again a composition of the image to be captured by the image capturing unit based on the composition determined by the composition determining section, the three-dimensional map image stored in the map image storage section and the position acquired by the position acquiring section, wherein the position identification unit identifies an other of the position of the image capturing unit and the position of the main subject based on the composition determined by the composition redetermination section.

11. The image capturing system according to claim 10, wherein the position acquiring section acquires the position to which the image capturing unit is fixed near the position presented by the position presentation section, the composition redetermination section determines the composition which allow the image capturing unit to capture the main subject and other subjects in the positional relationship approximately the same as the positional relationship between the main subject and the other subjects in the composition determined by the composition determination section based on the composition determined by the composition determination section, the three-dimensional map image stored in the map image storage section and the position of the image capturing unit acquired by the position acquiring section, and the position identification section identifies the position of the main subject based on the composition determined by the composition redetermination section.

12. The image capturing system according to claim 10, wherein the position acquiring section acquires the position to which the main subject is fixed near the position presented by the position presentation section, the composition redetermination section determines the composition that allows the image capturing unit to capture the main subject and other subjects in the positional relationship approximately the same as the positional relationship between the main subject and the other subjects in the composition determined by the composition determination section based on the composition determined by the composition determination section, the three-dimensional map image stored in the map image storage section and the position of the main subject acquired by the position acquiring section, and the position identification section identifies the position of the image capturing unit based on the composition determined by the composition redetermination section.

13. An image capturing method comprising:

storing a plurality of compositions which identify a background image and a position in the background image of a main subject in a composition storage section;

determining a composition desirable to a user among the plurality of compositions;

capturing by an image capturing unit an image of the main subject having the composition determined;

identifying at least one of the position of the image capturing unit and the position of the main subject based on the composition determined in the determining of the composition; and presenting to the user at least one of the position at which the image capturing unit is located and the position at which the main subject is located at a time that the image capturing unit captures the image, identified in the identifying of the position;

detecting a portable unit that is held by a person, who is a main subject of an image, and is located in a predetermined region within which the image having the determined composition can be captured by the image capturing unit;

identifying the position at which the person holding a detected portable unit is to be located when the image capturing unit captures the image having the determined composition so that the person can select a desirable composition; and when the portable unit is detected within the predetermined region, transmitting the identified position to the portable unit which presents the identified position to the person so that the person can take the image having the determined composition.

14. The image capturing system according to claim 1, further comprising a portable unit that is held by the user and that identifies a current position of the user, wherein the position presentation section presents to the user the current position of the user and at least one of the position at which the image capturing unit is located and the position at which the main subject is located at a time that the image capturing unit captures the image, which are identified by the position identification section.

* * * * *